(12) United States Patent
Tsyhanenko

(10) Patent No.: US 12,725,121 B2
(45) Date of Patent: Sep. 1, 2026

(54) MODULAR SMART PICKUP SYSTEM WITH INTEGRATED SENSORS

(71) Applicant: Pickpad Inc., Claymont, DE (US)

(72) Inventor: Yaroslav Tsyhanenko, Chicago, IL (US)

(73) Assignee: Pickpad Inc., Claymont, DE (US)

( * ) Notice: Subject to any disclaimer, the term of this patent is extended or adjusted under 35 U.S.C. 154(b) by 0 days.

(21) Appl. No.: 19/247,857

(22) Filed: Jun. 24, 2025

(65) Prior Publication Data

US 2026/0004235 A1 Jan. 1, 2026

Related U.S. Application Data

(60) Provisional application No. 63/666,282, filed on Jul. 1, 2024.

(51) Int. Cl.

| | |
|---|---|
| ***G06Q 10/087*** | (2023.01) |
| ***G06Q 10/083*** | (2024.01) |
| ***G06Q 10/0833*** | (2023.01) |
| ***G06Q 20/20*** | (2012.01) |

(52) U.S. Cl.

CPC ....... *G06Q 10/087* (2013.01); *G06Q 10/0833* (2013.01); *G06Q 10/0838* (2013.01); *G06Q 20/208* (2013.01)

(58) Field of Classification Search

CPC ............. G06Q 10/087; G06Q 10/0833; G06Q 10/0838; G06Q 20/208; G06Q 50/12

See application file for complete search history.

(56) References Cited

U.S. PATENT DOCUMENTS

| | | | | |
|---|---|---|---|---|
| 11,176,770 | B2 * | 11/2021 | Ambauen | G06Q 20/18 |
| 12,112,293 | B2 * | 10/2024 | Savage | G06Q 30/0635 |
| 2016/0260161 | A1 * | 9/2016 | Atchley | G01S 1/7034 |
| 2019/0304238 | A1 * | 10/2019 | Ambauen | G06Q 20/40145 |
| 2020/0167850 | A1 * | 5/2020 | Sullivan | G06K 7/1413 |

(Continued)

OTHER PUBLICATIONS

Drinkit—your daily digital coffee shop, DrinkIt, published Apr. 7, 2023, https://drinkit.io/, Accessed on Jun. 24, 2025, 6 pages.

(Continued)

*Primary Examiner* — Ariel J Yu
*Assistant Examiner* — Denisse Y Ortiz Roman
(74) *Attorney, Agent, or Firm* — FBT Gibbons LLP

(57) ABSTRACT

The present disclosure provides a smart pickup system comprising a smart pickup unit with a base platform configured to support an order, a plurality of sensors integrated with the smart pickup unit and configured to collect data about the order, a microcontroller in communication with the plurality of sensors and configured to analyze the collected data, and a user interface operatively connected to the microcontroller and configured to provide feedback based on the analyzed data. The system may include weight sensors to measure weight and weight distribution of the order, as well as temperature, humidity, or volume sensors. The user interface may comprise a display integrated into the base platform to show order information and status updates. Smart pickup management software may coordinate operation of multiple smart pickup units and interface with external systems such as point-of-sale and kitchen display systems.

19 Claims, 21 Drawing Sheets

(56) References Cited

U.S. PATENT DOCUMENTS

| | | | | |
|---|---|---|---|---|
| 2021/0049846 | A1* | 2/2021 | Kashi | G07C 9/00912 |
| 2021/0342805 | A1* | 11/2021 | Geiger | H04N 23/61 |
| 2022/0351167 | A1* | 11/2022 | Jagolta | G06Q 30/0633 |

OTHER PUBLICATIONS

Scala | Digital Signage | Smart Pickup Shelving, Scala, published Jun. 18, 2023, https://scala.com/en/solutions/smart-pickup-shelving/, Accessed on Jun. 24, 2025, 5 pages.

Food Lockers | Grubbrr, Grubbrr, published Dec. 16, 2024, https://grubbrr.com/products/food-lockers/, Accessed on Jun. 24, 2025, 12 pages.

Boxie Smart Lockers, Boxie, published May 19, 2025, https://www.boxielockers.com/, Accessed on Jun. 24, 2025, 8 pages.

Double Check—Acrelec, Acrelec a Glory company, published Aug. 25, 2024, https://acrelec.com/double-check/, Accessed on Jun. 24, 2025, 6 pages.

Wendy's weighing orders, Reddit, published 2024, https://www.reddit.com/r/doordash/comments/1cupy9u/wendys_weighing_orders/, Accessed on Jun. 24, 2025, 7 pages.

* cited by examiner

MODULAR SMART PICKUP SYSTEM WITH INTEGRATED SENSORS

PRIORITY

This application claims priority to U.S. Provisional Application No. 63/666,282, titled "Automated Order Pickup System and Software-Controlled Devices and Sensors for Enhanced Order Fulfillment Accuracy, Efficiency and User Experience," filed Jul. 1, 2024, which is hereby incorporated by reference in its entirety.

BACKGROUND

In recent years, the food service industry has seen significant changes in customer expectations and operational demands. Restaurants, cafes, and other food establishments are increasingly adopting technology to streamline their processes and enhance customer experiences. One area of focus has been the order pickup process, which plays a crucial role in customer satisfaction and operational efficiency.

Traditional order pickup methods often involve customers waiting in line at a counter or relying on staff to locate and retrieve their orders. These approaches can lead to inefficiencies, especially during peak hours when order volumes are high. Additionally, the growing popularity of mobile ordering and third-party delivery services has further complicated the order fulfillment process for many establishments.

The integration of technology into food service operations has opened up new possibilities for improving order management and pickup processes. Digital ordering systems, kitchen display screens, and customer-facing interfaces are becoming more common in restaurants of all sizes. These technologies aim to reduce wait times, minimize errors, and provide a more seamless experience for both customers and staff.

BRIEF DESCRIPTION OF FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

Figure 1:
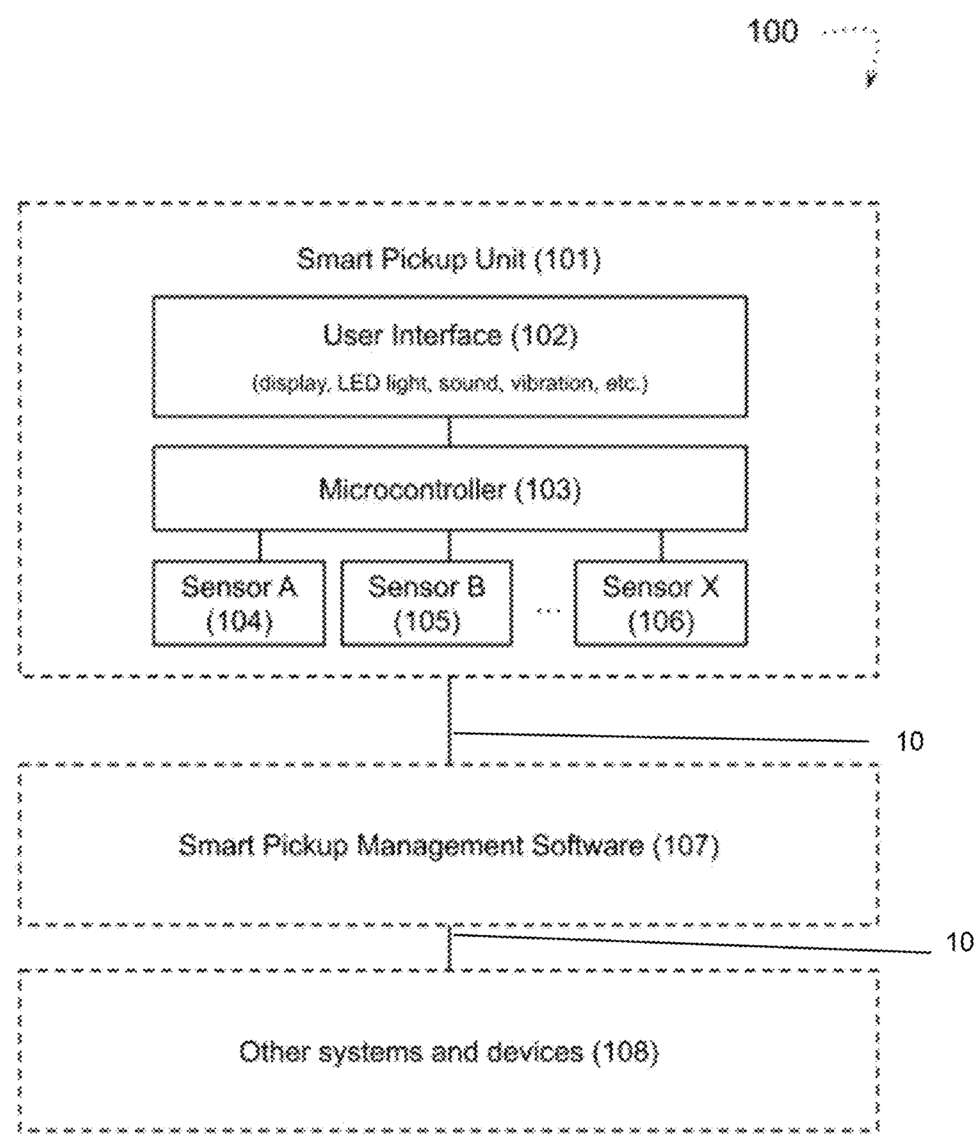
FIG. 1 depicts a block diagram of an illustrative smart pickup system, where the smart pickup system includes a single smart pickup unit.

The drawings are not intended to be limiting in any way, and it is contemplated that various embodiments of the invention can be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

For clarity of disclosure, to the extent that spatial terms such as "top," "bottom," "upper," "lower," "vertical," "horizontal," or the like are used herein with reference to the drawings, it will be appreciated that such terms are used for illustrative description purposes only and are not intended to be limiting or absolute. In that regard, it will be understood that surgical instruments such as those disclosed herein can be used in a variety of orientations and positions not limited to those shown and described herein.

Furthermore, the terms "about," "approximately," and the like as used herein in connection with any numerical values or ranges of values are intended to encompass the exact value(s) referenced as well as a suitable tolerance that enables the referenced feature or combination of features to function for the intended purpose described herein.

I. Illustrative Smart Pickup Systems

As mentioned above, the integration of technology into food service operations has opened up new possibilities for improving order management and pickup processes. However, the implementation of new technologies in food service environments presents its own set of challenges. Restaurants must consider factors such as space constraints, staff training, and integration with existing systems. Furthermore, the diverse range of restaurant layouts and operational models requires flexible solutions that can be adapted to different environments.

In the food service industry, pickup orders typically involve customers placing orders in advance through mobile apps, websites, or by phone, then arriving at the restaurant to collect their prepared food. However, this process often faces numerous challenges including order mix-ups, difficulty identifying the correct order, theft of unattended orders, food quality deterioration while waiting, inefficient staff workflow during peak hours, and lack of verification that the correct items are included. Additionally, customers frequently experience frustration from waiting in crowded pickup areas, uncertainty about order status, and difficulty identifying which order belongs to them. Therefore, it may be desirable to utilize a smart pickup system incorporating sensor technology, data analytics, and automation in order to address at least some of these issues by providing accurate order verification, secure customer authentication, real-time monitoring of food conditions, and/or clear visual indicators for both customers and staff.

A. Illustrative Smart Pickup System with Single Smart Pickup Unit

FIG. 1 illustrates a block diagram of a smart pickup system (100). In some aspects, smart pickup system (100) may provide a comprehensive solution for addressing the challenges in food service pickup operations. The system may integrate various components to prevent order mix-ups, verify order accuracy, securely authenticate customers, monitor food conditions in real-time, and/or provide clear visual indicators for both customers and staff, thereby enhancing the overall pickup experience.

In the current illustrative example, smart pickup system (100) includes a smart pickup unit (101) and smart pickup management software (107), which may also be in communication with and/or incorporated into other systems and devices (108) (e.g., a restaurant's point-of-sale system). Smart pickup unit (101) communicates with smart pickup management software (107) through a line of communication (10). Smart pickup management software (107) in turn connects to external systems (108) through another line of communication (10). These lines of communication (10) may include any suitable communication means or combination thereof, such as wired connections (e.g., Ethernet, USB, serial, parallel), wireless connections (e.g., Wi-Fi, Bluetooth, NFC, RFID, cellular), optical connections, or any other suitable data transmission technology as would be apparent to one skilled in the art in view of the teachings herein.

During illustrative use, as will be elaborated in greater detail herein, smart pickup unit (101) can be configured to have an ordered item(s) (e.g., one or more drink orders, a food item, a plurality of food items stored in a bag, etc.) placed on top of smart pickup unit (101), confirm or deny the accuracy of the ordered item(s) resting on top of smart pickup unit (101), communicate details regarding the ordered item(s), confirm when the ordered item(s) is taken by a customer, monitor environmental conditions affecting the ordered item(s) such as temperature and humidity, detect unauthorized removal of the ordered item(s), authenticate customers through various methods, provide personalized customer experiences, track wait times for ordered item(s), optimize order placement based on learned patterns, and/or generate various alerts associated with the ordered item(s) in accordance with the description herein.

Smart pickup unit (101) includes a platform that may support a customer's prepared order. This platform may be constructed of durable materials suitable for food service environments, such as stainless steel, food-grade polymers, a layer of decorative film (e.g., decorative film layer (132) in FIG. 4), and/or composite materials that can be easily cleaned and sanitized. The platform may have a flat, slightly textured surface to prevent order slippage while still allowing for easy cleaning. In some implementations, the platform may include subtle raised edges or a slight depression in the center to help contain any potential spills or leaks from food containers. The platform may be sized appropriately to accommodate various order sizes, from single beverages to larger bags containing multiple food items. Additionally, the platform may incorporate visual indicators, such as subtle markings or illuminated areas (e.g., components of user interface (102)), to guide proper order placement for optimal sensor readings.

Smart pickup unit (101) includes a user interface (102), a microcontroller (103), and a plurality of sensors (104, 105, 106). Microcontroller (103) is in communication with user interface (102) and is configured to provide instructions to user interface (102). Additionally, microcontroller (103) is in communication with sensors (104, 105, 106) and is configured to utilize information provided by sensors (104, 105, 106) in accordance with the description herein.

User interface (102) may provide visual, auditory, or tactile feedback to both customers and staff. In some implementations, user interface (102) may display order numbers, customer names, or pickup status information. The interface may also incorporate LED lights or sound outputs to indicate when an order is ready or when a customer approaches for pickup. Therefore, during illustrative use, user interface (102) may provide feedback to an employee as to what order should be placed on smart pickup unit (101). As another example, user interface (102) may provide feedback to a customer that the order supported on smart pickup unit (101) belongs to them. As yet another example, user interface (102) may provide feedback to an employee that the wrong order has been placed on smart pickup unit (101).

Additionally, user interface (102) may also display data associated with the various functionality described herein, such as display temperature alerts when an order exceeds temperature thresholds, notify staff when an order has been waiting too long for pickup, provide authentication feedback when a customer checks in via app or QR code, display personalized messages for loyalty program members, indicate when unauthorized order removal is detected, show weight distribution data to verify order accuracy, provide visual confirmation when staff override incorrect alerts, display ambient environmental conditions affecting order parameters, and/or illuminate customer names only upon proper authentication as part of the "invisible lock" security feature. Of course any other suitable feedback may be provided by user interface (102) during illustrative use as would be apparent to one skilled in the art in view of the teachings herein.

Microcontroller (103) may serve as the central processing unit for smart pickup unit (101), coordinating data from various sensors and managing communication with other system components. The microcontroller (103) may analyze sensor inputs, control display outputs, and facilitate data exchange with smart pickup management software (107). Microcontroller (103) may include any suitable components, or combination of components, as would be apparent to one skilled in the art in view of the teachings herein.

Smart pickup management software (107) can be installed on a designated computer system and/or readily incorporated into other suitable systems and/or devices (108) that are utilized in restaurants, coffee shops, or other suitable locations where items are picked up by customers, carriers, or any other suitable person or device as would be apparent to one skilled in the art in view of the teachings herein. In some implementations, the functionality between microcontroller (103) and smart pickup management software (107) may be distributed flexibly, with certain processing tasks being performed by either component depending on system configuration, processing requirements, or operational conditions. This architectural flexibility allows the system to optimize performance by allocating computational tasks to the most appropriate component based on factors such as processing power, network conditions, or real-time requirements.

As mentioned above, smart pickup system (100) may incorporate sensor technology to monitor and verify order details. In the current example, microcontroller (103) connects to multiple sensors, including sensor A (104), sensor B (105), and additional sensors up to sensor X (106). These sensors may be incorporated into suitable portions of smart pickup unit (101) in order to monitor suitable parameters and/or conditions of various orders. These parameters and/or conditions may include weight, weight distribution, temperature, humidity, presence or absence of an order, order dimensions, order volume, ambient environmental conditions, time elapsed since order placement, unauthorized order removal, customer proximity, and authentication status. Sensors can include weight sensors, pressure sensors, temperature sensors, capacitive touch sensors, humidity sensors, optical sensors, proximity sensors, motion sensors, light sensors, infrared sensors, ultrasonic sensors, and/or any other suitable sensors as would be apparent to one skilled in the art in view of the teachings herein. In some implementations, just one type of sensor may be used. For example, weight sensors within smart pickup unit (101) may detect the presence and characteristics of orders placed on the unit. This capability may allow the system to confirm that the correct items have been prepared and placed for pickup.

While sensors of the current example are shown incorporated into smart pickup unit (101), in some instances, one or more sensors may be incorporated into other structures sufficiently adjacent to smart pickup unit (101).

Smart pickup unit (101) may also include interactive interfaces that enable direct user interaction with the system. In some implementations, smart pickup unit (101) may incorporate physical buttons or touch-sensitive elements that allow staff members to provide input through direct interaction with the unit itself. These interactive interfaces may be configured to detect various types of user input, such as single clicks, double clicks, taps, double taps, or other touch gestures applied to the surface of smart pickup unit (101).

The touch-sensitive elements may utilize capacitive touch sensors or weight sensors to interpret user interactions. For example, staff members may override incorrect alerts by performing specific gestures such as double or triple tapping on the surface of smart pickup unit (101). This capability may provide operational flexibility in cases where sensor data may not accurately reflect an order's contents due to factors such as unusual packaging or non-standard item combinations.

In some aspects, the interactive interfaces may be integrated seamlessly into the platform surface of smart pickup unit (101), maintaining the unit's aesthetic appearance while providing functional input capabilities. The system may be configured to distinguish between intentional user interactions and incidental contact that may occur during normal order placement or retrieval activities.

Additionally, smart pickup unit (101) may be controlled through external display systems or management interfaces, providing multiple avenues for staff interaction and system control. The combination of direct touch interfaces and external control options may enhance the versatility and usability of smart pickup unit (101) in various operational scenarios.

Smart pickup management software (107) may provide a centralized platform for overseeing multiple smart pickup units and integrating with external systems (108). These external systems (108) may include point-of-sale (POS) systems, kitchen display systems (KDS), kitchen order management systems, restaurant management platforms, third-party delivery applications, customer loyalty programs, inventory management systems, and mobile ordering applications. This software may enable real-time tracking of order status, generate alerts for staff when orders are ready or when issues arise, and collect data for analysis and system optimization. The integration with these diverse external systems (108) allows the smart pickup system to function seamlessly within existing restaurant technology ecosystems while enhancing order accuracy and customer experience.

In some cases, smart pickup system (100) may incorporate machine learning algorithms to adapt to specific restaurant environments and order patterns. These algorithms may analyze historical data to predict peak pickup times, optimize order placement strategies, or identify potential issues before they occur.

The system may also offer customization options to accommodate various restaurant layouts and operational needs. For instance, as will be described in greater detail herein, different smart pickup units may be arranged in different configurations, such as countertop, wall-mounted, or freestanding setups, to best utilize available space and streamline customer flow.

By integrating these various components and functionalities, smart pickup system (100) may provide a flexible and efficient solution for managing order pickups in diverse food service settings. The system may help reduce wait times, minimize errors, and enhance the overall experience for both customers and staff.

In an illustrative use of smart pickup system (100), an order may be placed through a restaurant's point-of-sale system or mobile application. Smart pickup system (100) may receive the order details through the line of communication (10) connecting to external systems (108).

Once the order is prepared, a staff member may place it on the platform of smart pickup unit (101). Sensors (104, 105, 106) within smart pickup unit (101) may then collect data about the order, such as its weight, temperature, and dimensions. Microcontroller (103) may analyze this sensor data and compare it to the expected parameters for the order.

If the sensor data matches the expected order details, smart pickup unit (101) may confirm the order's accuracy. However, if discrepancies are detected, an error signal may be generated and displayed on user interface (102), prompting staff to verify and correct the order if necessary.

When a customer arrives to collect their order, they may interact with user interface (102) to identify themselves. This could involve scanning a QR code, entering a pickup code, or using near-field communication (NFC) technology on their mobile device. Upon successful authentication, user interface (102) may display the customer's name or order number, indicating which items belong to them. In some instances, no authentication is required and the customer's name or order number is shown when the order accuracy is confirmed or when the order is placed on the platform.

As the customer retrieves their order from the platform of smart pickup unit (101), sensors (104, 105, 106) may detect the removal of the items. Microcontroller (103) may then communicate this information to smart pickup management software (107), which may record the order as picked up and update its status in connected systems.

Throughout this process, smart pickup system (100) may continuously monitor and adapt to various factors such as order volume, pickup times, and environmental conditions, potentially using machine learning algorithms to optimize its performance over time.

B. Illustrative Smart Pickup System with Multiple Smart Pickup Units

In some instances, it may be desirable for a vendor (e.g., restaurant, coffee shop, etc.) to place multiple orders on display for being picked up simultaneously, thereby accommodating multiple orders from different customers at one time. This capability allows restaurants to efficiently manage high-volume pickup periods, reduce customer wait times, and optimize the use of available counter space by displaying numerous orders ready for collection by various customers concurrently.

Figure 2:
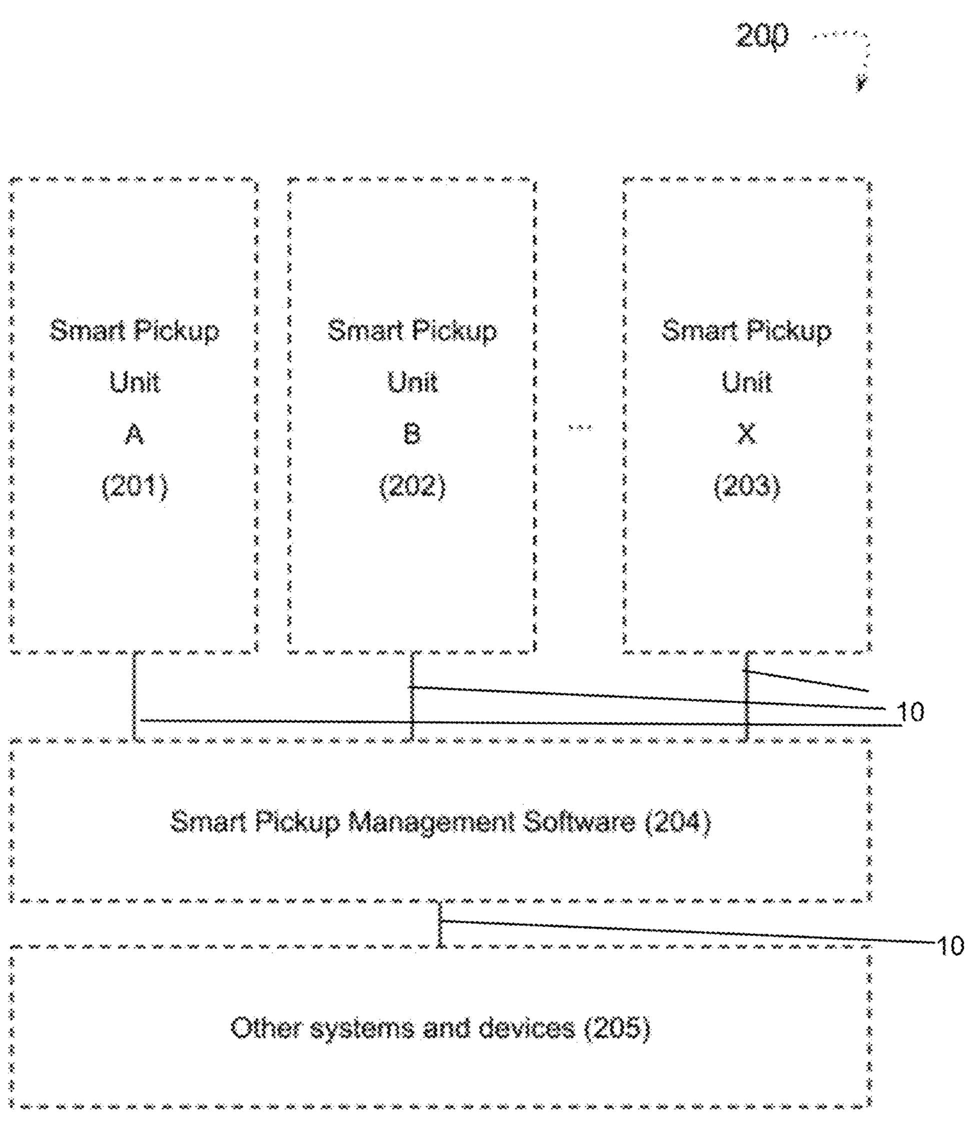
FIG. 2 depicts a block diagram of another illustrative smart pickup system, where the smart pickup system includes multiple smart pickup units.

FIG. 2 illustrates a block diagram of a multi-unit smart pickup system (200) with multiple smart pickup units arranged in series. Unlike the system (100) of FIG. 1 which includes a single smart pickup unit (101), smart pickup system (200) includes smart pickup unit A (201), smart pickup unit B (202), and smart pickup unit X (203). While three units are shown in the current example, any suitable number of units may be utilized as would be apparent to one skilled in the art in view of the teachings herein.

Each of these smart pickup units may be substantially similar to the smart pickup unit (101) of FIG. 1, including similar user interfaces, microcontrollers, and sensors. These smart pickup units are connected via lines of communication (10) to smart pickup management software (204). Additionally, each smart pickup unit may be in communication with each other, allowing for direct data exchange between units. In some configurations, certain smart pickup units may act as intermediaries between other units and the smart pickup management software (204), relaying information and commands through the system.

Smart pickup management software (204) serves as a central control component that coordinates operation of multiple smart pickup units. Smart pickup management software (204) connects to external systems (205) through additional lines of communication (10), similar to how smart pickup management software (107) connects to external systems (108) in FIG. 1. Therefore, it should be understood that smart pickup software (204) and external systems (205) may be substantially similar to smart pickup managements software (107) and external systems (108) described above, with differences elaborated below.

In multi-unit smart pickup system (200), the process of managing multiple orders may involve additional coordination and communication between units and software (204). When a take-out order is received via the POS system (or other suitable system), smart pickup management software (204) may analyze various factors to designate a particular smart pickup unit for that order.

The designation process may consider factors such as current occupancy of each unit, order size, expected pickup time, and proximity to kitchen or customer entry points. Once a unit is selected, smart pickup management software (204) may send instructions to the chosen smart pickup unit.

Upon receiving these instructions, the user interface of the designated smart pickup unit may activate to guide employees. For example, smart pickup unit A (201) may display a message such as "Place Order 123 here" or illuminate in a specific color to indicate it is ready to receive an order. This visual cue may help kitchen staff quickly identify where to place prepared take-out orders, potentially reducing errors and improving efficiency during busy periods.

As orders are placed on different units, smart pickup system (200) may update its internal status tracking. Each smart pickup unit may communicate its current state (e.g., empty, occupied, order details) to smart pickup management software (204), allowing for real-time monitoring of the entire system's capacity and order distribution.

For customers, the multi-unit configuration may provide enhanced clarity during pickup. When a customer arrives, they may interact with any of the smart pickup units or a central kiosk to identify themselves, if the optional security check-in feature is activated. Upon successful authentication, smart pickup system (200) may activate the user interface on the specific unit holding their order. For instance, if a customer's order is on smart pickup unit B (202), that unit's display may show the customer's name or order number, while other units remain inactive or display generic information. If the security check-in feature is not activated, customer names or order numbers may be displayed on the respective units by default without requiring authentication.

This targeted activation may help guide customers to the correct unit, reducing confusion in busy environments where multiple orders are being picked up simultaneously. The system may also incorporate visual or auditory cues to further assist customers, such as flashing lights or subtle sounds emitted from the unit holding their order. These features can be implemented regardless of whether the optional security check-in feature is enabled.

In some implementations, smart pickup system (200) may dynamically reassign orders between units based on changing conditions. For example, if a unit experiences a malfunction or if order pickup patterns shift unexpectedly, the system may redistribute orders to optimize space usage and minimize wait times.

The multi-unit configuration may also enable more sophisticated order grouping strategies. For instance, the system may cluster orders with similar characteristics (e.g., temperature requirements, size, or pickup time) on adjacent units, potentially streamlining the pickup process for both staff and customers. Additionally, the system may leverage clusters of multiple pads to accommodate a single larger order, such as a catering order or large pizza box. Instead of requiring restaurants to maintain different sizes of pads, the system allows multiple standard-sized pads arranged in a row or grid formation to function as a unified surface for supporting oversized orders. When multiple pads are clustered together for a single order, the system recognizes that the order spans across multiple pads and aggregates sensor data accordingly, maintaining accurate order verification while accommodating items of various dimensions.

In some cases, as described in greater detail herein, smart pickup system (200) can include an optional 'invisible lock' security feature. This feature, which can be activated or deactivated by suitable staff on demand, can only display order information on the user interfaces of the smart pickup units when a customer checks in. When activated, customer check-in can be verified through various methods, such as mobile application authentication, QR code scanning, Bluetooth proximity detection, or Bluetooth beacon technology that allows for more precise geolocation positioning than standard Bluetooth.

Smart pickup system (200) can utilize ceiling-mounted cameras for computer vision capabilities. These cameras can be part of external systems (205) and can communicate with smart pickup management software (204). In some cases, computer vision capabilities can be used to distinguish between similar items placed on smart pickup units, enhancing order accuracy verification across multiple units.

C. Illustrative Smart Pickup Units

Figure 3:
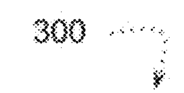
FIG. 3 depicts a perspective view of an illustrative smart pickup unit with an order, according to aspects of the present disclosure.
Figure 3:
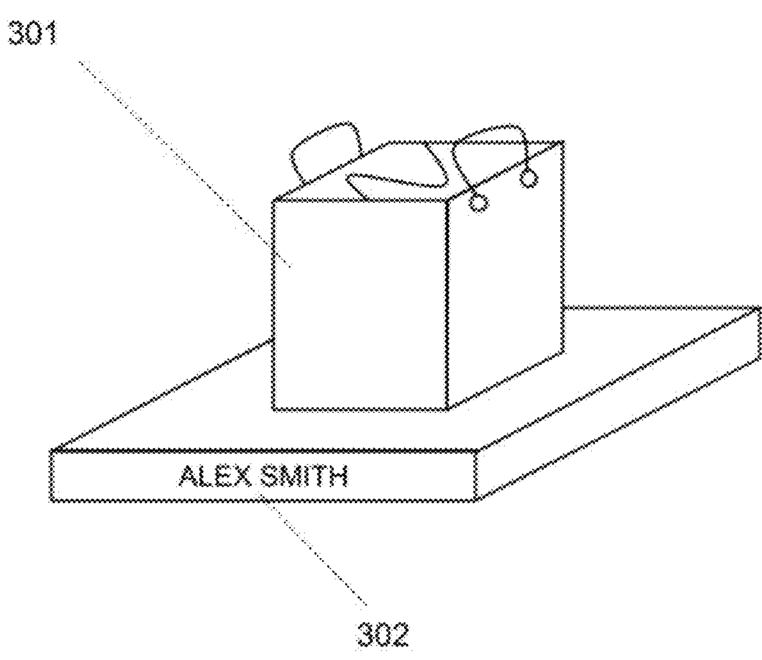

FIG. 3 illustrates a perspective view of a smart pickup unit (300) with an order (301) positioned on a base platform (302). Smart pickup unit (300) can be incorporated into the systems of FIGS. 1 and 2 as a replacement for one or more of the pickup units described therein. In some aspects, smart pickup unit (300) can provide a more compact and visually intuitive design compared to previously described units. It should be understood that smart pickup unit (300) may include any of the features and functionality of the previously described smart pickup units, including but not limited to the sensors, microcontroller, user interface, and communication capabilities described in relation to smart pickup unit (101), etc. The features and components of the various smart pickup units described throughout this disclosure may be combined in any suitable manner as would be apparent to one skilled in the art in view of the teachings herein.

Smart pickup unit (300) can include a user interface integrated into the base platform (302). This interface can incorporate display elements, such as LED lights or a small screen, to show order information and status updates. In some implementations, the base platform (302) can include the text "ALEX SMITH" or other customer-specific identifiers to facilitate order pickup.

When integrated into the system of FIG. 1, smart pickup unit (300) can replace smart pickup unit (101). In this configuration, the base platform (302) can house the microcontroller (103) and various sensors (104, 105, 106) within its structure. The user interface elements can be incorporated into the surface of base platform (302), providing a sleek and unified appearance.

In the multi-unit system of FIG. 2, multiple smart pickup units (300) can be arranged in series, replacing smart pickup units A (201), B (202), and X (203). Each unit can maintain individual communication with the smart pickup management software (204) through lines of communication (10). This arrangement can allow for a more space-efficient setup while retaining the functionality of the previously described system.

Smart pickup unit (300) can incorporate weight sensors within the base platform (302) to detect the presence and characteristics of order (301). These sensors can communicate with the microcontroller and smart pickup management software to verify order accuracy and monitor pickup status. In some implementations, the surface of base platform (302) can utilize materials or coatings that enhance durability and ease of cleaning, suitable for food service environments.

The compact design of smart pickup unit (300) can allow for flexible placement options within various restaurant layouts. Units can be positioned on countertops, integrated into custom furniture, or arranged in modular configurations to suit specific operational needs. This versatility can enable restaurants to optimize their pickup areas for both efficiency and customer experience.

Figure 4:
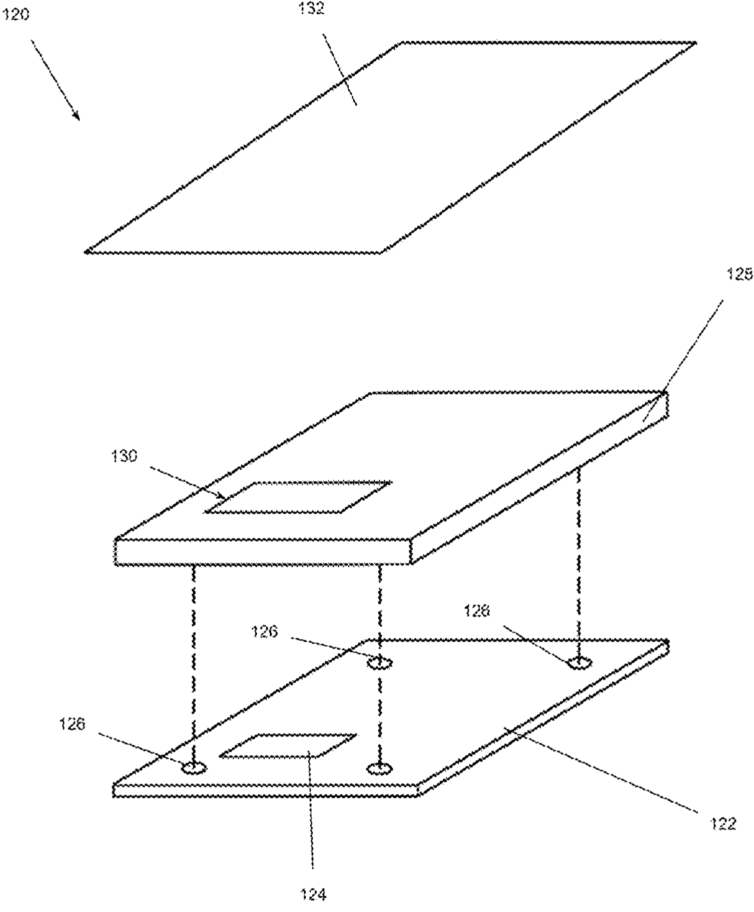
FIG. 4 depicts an exploded view of another illustrative smart pickup unit.

FIG. 4 illustrates an exploded view of a smart pickup unit (120). Smart pickup unit (120) can be used in replacement of smart pickup units described above, including smart pickup unit (101) in FIG. 1, smart pickup units (201), (202), and (203) in FIG. 2, and smart pickup unit (300) in FIG. 3. Smart pickup unit (120) includes a base (122) that forms a foundation for other components. It should be understood that smart pickup unit (120) may include any of the features and functionality of the previously described smart pickup units, including but not limited to the sensors, microcontroller, user interface, and communication capabilities described in relation to smart pickup unit (101), etc. The features and components of the various smart pickup units described throughout this disclosure may be combined in any suitable manner as would be apparent to one skilled in the art in view of the teachings herein.

Base (122) can include connectors (126) positioned at strategic locations to facilitate both electrical and mechanical connections between components. These connectors (126) comprise magnetic elements that selectively couple with corresponding elements in pad (128), thereby enabling efficient attachment and detachment of pad from base while maintaining structural integrity. In some implementations, the connectors (126) may be further configured to establish bidirectional electrical communication with appropriate components integrated within pad. For instance, if pad incorporates advanced sensing technologies (pressure sensors, capacitive sensors, temperature sensors, etc.) or thermal regulation elements (heating elements, cooling elements, or thermoelectric modules), connectors (126) may establish robust electrical communication pathways between those sophisticated components and a microprocessor housed within base, thereby enabling comprehensive data collection and system control.

Figure 6:
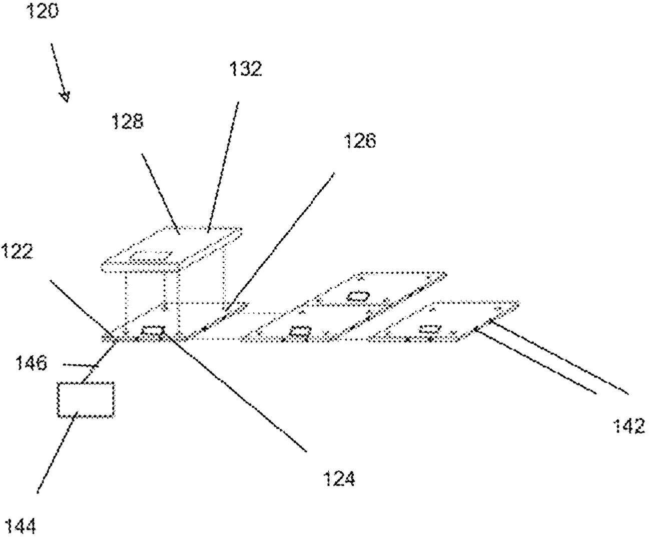
FIG. 6 depicts an exploded view of a smart pickup system incorporating multiple smart pickup units of FIG. 5, with select portions intentionally omitted.

As shown in FIG. 6, base (122) also includes base coupling connectors (142) located on the periphery of base (122), which allow bases (122) to easily couple to other bases (122) to form a customized layout of smart pickup units (120). Base coupling connectors (142) can utilize various coupling mechanisms including magnetic, mechanical, or other suitable connection methods, and can also potentially serve a dual purpose by providing both mechanical and electrical connections between adjacent smart pickup units (120). The coupling mechanism ensures secure physical attachment while maintaining precise alignment between units, creating a stable modular system that can be arranged in various configurations to accommodate different restaurant layouts and operational needs. Additionally, base coupling connectors (142) incorporate electrical contact points that enable power transmission between connected units in a daisy-chain configuration.

This power-sharing capability allows multiple smart pickup units (120) to operate from a single power source, with electricity flowing from one unit to the next through the connections. As a result, only a single detachable cord (146) needs to be plugged into one smart pickup unit (120) to power an entire array of connected units, significantly reducing cable management issues and providing a cleaner, more streamlined installation in customer-facing areas. This integrated power distribution system enhances the modularity and flexibility of the smart pickup system while minimizing visible wiring and connection points.

In some implementations, the detachable cord (146) may be configured to selectively attach to a pad (128) rather than a base (122), and the pad (128) may be configured to receive such cord. This configuration allows for flexible placement of the units without the need for multiple power outlets, as the pad (128) can include power distribution components that enable electricity to flow to connected units.

In other instances, the detachable cord (146) may interface with a management device (144) that hosts management software and facilitates data connections between individual pads and the broader smart pickup system (e.g., system 200). This integrated approach may streamline both power delivery and data communication through a single connection point, potentially simplifying installation and reducing cable clutter in customer-facing areas. Since the pad (128) may incorporate some or all of the electronic components, including microcontrollers, sensors, and communication interfaces, connecting the detachable cord (146) directly to the pad (128) enables a more versatile system configuration where the base (122) primarily serves for mechanical support and connectivity between units.

Smart pickup units (120) may also be equipped with wireless communication capabilities, enabling them to interact with other components of the smart pickup management system, such as the management software, without the need for physical connections. This wireless functionality may provide greater flexibility in unit placement and system scalability, as units can be easily added or repositioned without reconfiguring wired connections.

The base coupling connectors (142) may be designed to facilitate data transmission between adjacent smart pickup units (120). This feature may allow for the creation of a mesh network among connected units, enabling efficient data routing and redundancy in communication pathways. Similarly, the connectors (126) between each base (122) and their respective pad (128) may be configured to facilitate data transmission, enabling bidirectional communication between these components. In some implementations, adjacent pads (128) may be operatively connected to each other to facilitate direct communication without requiring base-to-base transmission, providing additional flexibility in system configuration. By leveraging both the connections for mechanical coupling and data transfer, the system may achieve a high degree of modularity and adaptability to various restaurant layouts and operational requirements.

These diverse connectivity options may enhance the versatility and robustness of the smart pickup system, allowing for tailored configurations that meet the specific needs of different food service environments while maintaining seamless integration with the overall management infrastructure.

As at least shown in FIG. 4, a display (124) can be positioned on a top surface of base (122) or incorporated into pad (128) in this embodiment. It should be understood that display (124) can be incorporated into smart pickup unit (120) using any other suitable means as would be apparent to one skilled in the art in view of the teachings herein. For example, display can be integrally attached to the top surface of base, display can be housed within a recessed pocket defined by base, or display can be integrated within the pad. Display can extend upwardly from base. Display (124) can display suitable information, such as information related to an order resting on top of pickup unit (120) (e.g., order numbers, customer names, pickup status, etc.). Display (124) can include a series of seven-segment displays to show numeric information and/or fourteen-segment displays to show alphanumeric information such as customer names, order identifiers, and/or any other suitable information related to an order and/or operation of smart pickup unit (120) or system. Of course, display (124) can include any suitable components as would be apparent to one skilled in the art in view of the teachings herein.

In some instances, pad (128) can be configured to be placed over base (122) and may contain display (124) components. Alternatively, when display (124) is incorporated into base (122), pad (128) can define a window (130) that aligns with display (124) to allow visibility of displayed information.

A decorative film layer (132) can form an uppermost layer of smart pickup unit (120). Decorative film layer (132) can be designed to be applied over pad (128), providing a transformative aesthetic finish while maintaining functionality of underlying components. In some cases, decorative film layer (132) can utilize 3M Architectural Films (e.g., 3M DI-NOC) to create customizable aesthetic appearances. The decorative film layer (132) provides a remarkable visual advantage by completely concealing display (124) when the display is deactivated, creating a seamless, uninterrupted surface appearance. However, when display (124) is illuminated, the light selectively transmits through the decorative film layer (132), creating a striking visual effect where illuminated characters, numbers, or graphics appear to materialize directly from within the film itself. This creates a sophisticated, high-end appearance where information seems to emerge organically from what otherwise appears to be a decorative surface, giving the impression that the film itself is being activated rather than revealing a conventional display underneath. This distinctive visual characteristic allows smart pickup unit (120) to maintain an elegant, uncluttered appearance during inactive periods while providing clear, attention-grabbing information when needed, seamlessly integrating advanced technology with sophisticated aesthetics in various restaurant environments.

Figure 5:
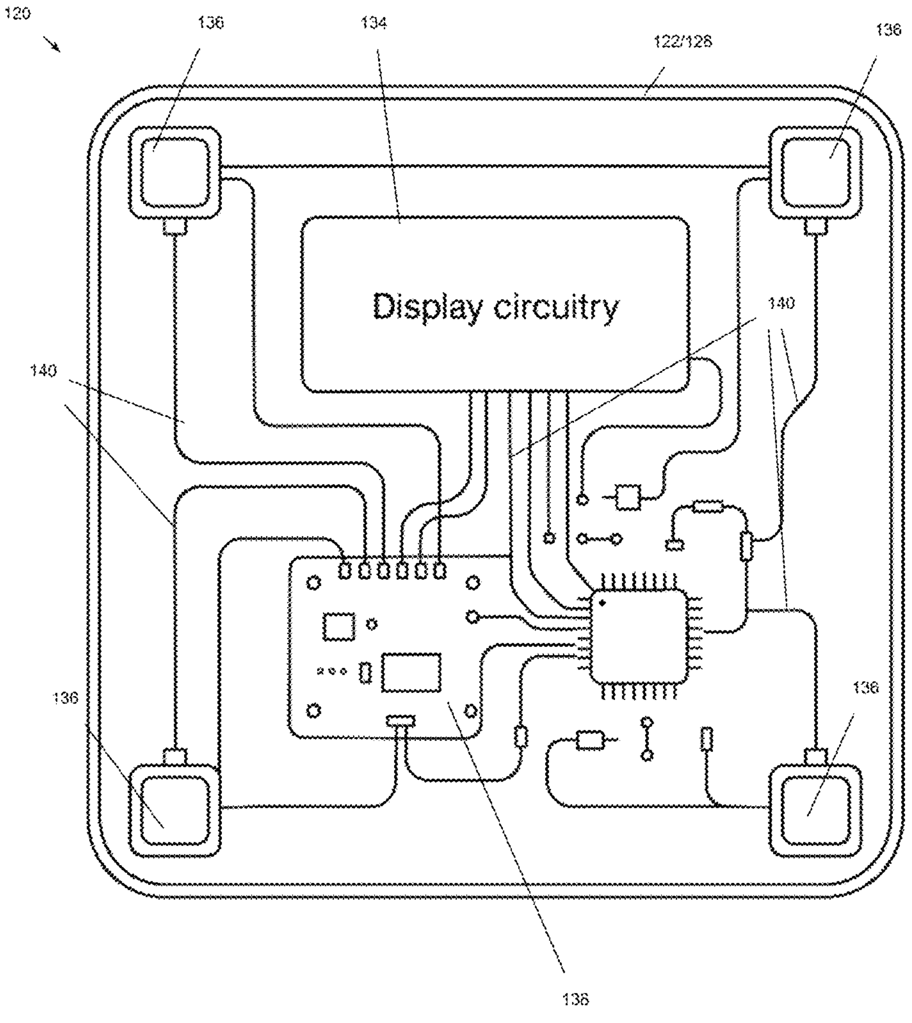
FIG. 5 depicts a bottom plan view of the smart pickup unit of FIG. 4.

FIG. 5 illustrates a bottom plan view of either base (122) or pad (128) of smart pickup unit (120). The bottom surface reveals various components that may be incorporated into either the base (122) or pad (128), or distributed between both components. Display circuitry (134) may be positioned within base (122) or pad (128) and provides visual output capabilities. Multiple weight sensors (136) may be positioned at different locations around a perimeter of base (122) or incorporated into the underside of pad (128). A control unit (138) may be located within either base (122) or pad (128) and coordinates operation of smart pickup unit (120). Communication lines (140) connect various components, enabling data and control signal transmission between weight sensors (136), display circuitry (134), and control unit (138).

Display circuitry (134) is in communication with display (124) and can be configured to activate display (124) in accordance with the description herein. Display circuitry (134) is also in communication with control unit (138) and is configured to activate display (124) in response to instructions received from control unit (138). When display circuitry (134) is incorporated into pad (128) and control unit (138) is incorporated into base (122), or vice versa, connectors (126) facilitate communication between these components. This configuration can allow for dynamic control of visual information presented to users via display (124), enabling the smart pickup unit (120) to adapt its display output based on various factors such as order status, customer proximity, or environmental conditions.

Control unit (138) may serve as the central processing component for smart pickup unit (120), coordinating various functions and managing data flow between different components. In some implementations, control unit (138) may include a microprocessor, memory, and input/output interfaces to facilitate communication with other elements of the smart pickup unit. Depending on the specific embodiment, control unit (138) may be incorporated entirely within pad (128), entirely within base (122), or with processing components distributed between both pad (128) and base (122).

The control unit (138) may be configured to process data from weight sensors (136), interpret customer interactions, manage display outputs through display circuitry (134), and communicate with external systems via wired or wireless connections. In some aspects, control unit (138) may execute algorithms for order verification, weight distribution analysis, and customer authentication. The control unit (138) may also detect and interpret user interactions such as taps, double taps, or other touch gestures on the pad (128) surface, enabling staff to provide input through direct interaction with the pad itself, such as overriding incorrect alerts through double or triple tapping.

Control unit (138) may also be responsible for power management within smart pickup unit (120), regulating power distribution to various components and optimizing energy consumption. In some cases, it may implement sleep modes or low-power states when the unit is not actively in use. When multiple smart pickup units (120) are connected in a modular configuration, power may be distributed through base coupling connectors (142) from a single power source connected to any pad (128) in the system via detachable cord (146), eliminating the need for multiple power connections.

The control unit (138) may be programmed with firmware that can be updated remotely, allowing for feature enhancements and bug fixes without physical intervention. In some implementations, control unit (138) may incorporate machine learning capabilities, enabling the smart pickup unit to adapt its behavior based on usage patterns and environmental factors over time. These machine learning capabilities may help optimize order accuracy verification by continuously refining the acceptable parameter ranges based on real-world data collected during operation.

Additionally, control unit (138) may manage the smart pickup unit's participation in a larger network of connected units, coordinating data sharing and synchronization with other units and the central management software. This networked functionality may allow for distributed processing and load balancing across multiple units in more complex installations. In embodiments where electronic components are distributed between pad (128) and base (122), connectors (126) provide both mechanical coupling and data transmission pathways between these components, ensuring seamless operation of the complete unit.

As mentioned above, multiple weight sensors (136) are positioned at different locations around a perimeter of base (122) or incorporated into the underside of pad (128). In some aspects, weight sensors (136) can be located at the four corners to provide comprehensive weight distribution measurements. In embodiments where weight sensors (136) are incorporated into pad (128), the pad serves as the primary sensing component while the base (122) primarily provides structural support and connectivity to other units.

Weight sensors (136) can be in communication with control unit (138) through communication lines (140). This configuration allows for real-time data transmission from the weight sensors to the control unit for processing and analysis. When weight sensors (136) and control unit (138) are in different components (pad or base), connectors (126) facilitate this communication. Weight sensors (136) can be capable of measuring the load of an order resting on the pickup unit (120), providing accurate weight information for each item placed on the surface.

In addition to overall weight measurement, weight sensors (136) can be capable of measuring the weight distribution of an order resting on the pickup unit (120). By analyzing data from multiple sensors simultaneously, control unit (138) can determine how the weight of an order is distributed across the surface of the pickup unit. This feature can assist in verifying order accuracy and detecting any potential issues with item placement. In some implementations, in a similar manner to system (200) described above, multiple pads can be clustered together to support larger orders, with the system recognizing that a single order spans multiple pads and aggregating sensor data accordingly.

This data can be used for various purposes, such as order verification, inventory management, or quality control. The ability to analyze weight distribution can also help in detecting whether multiple items have been placed on the pickup unit or if an item has been partially removed. In food service environments, this capability enables verification that all components of an order are present before customer notification.

Weight sensors (136) can include any suitable components as would be apparent to one skilled in the art in view of the teachings herein. For example, weight sensors can utilize strain gauge technology, load cells, or other pressure-sensitive elements to accurately measure applied forces. The specific type and configuration of weight sensors can be selected based on factors such as required accuracy, durability, and cost-effectiveness for the intended application.

In some implementations, weight sensors (136) can be calibrated to account for the weight of the pickup unit itself, ensuring accurate measurements of items placed on the surface. The sensitivity of weight sensors can be adjustable, allowing the system to be fine-tuned for different types of orders or environmental conditions. This calibration capability can also be used in food preparation environments to assist with portion control, providing visual feedback to staff about proper portioning during food assembly processes.

The data collected from weight sensors (136) can be used in conjunction with other sensing technologies incorporated into smart pickup unit (120) to provide a comprehensive understanding of order status and characteristics. These additional sensors may include temperature sensors, humidity sensors, or volume sensors, which can be incorporated into either pad (128) or base (122) depending on the specific implementation. This multi-sensor approach can enhance the overall accuracy and reliability of the smart pickup system.

In some cases, smart pickup unit (120) can include a heating/cooling element to maintain food temperature. This element can be integrated within base (122) or pad (128) and can be controlled by control unit (138). Temperature maintenance capabilities can allow smart pickup unit (120) to preserve food quality for extended periods, enhancing customer satisfaction and food safety.

D. Illustrative Modified Smart Pickup Units

Figure 19:
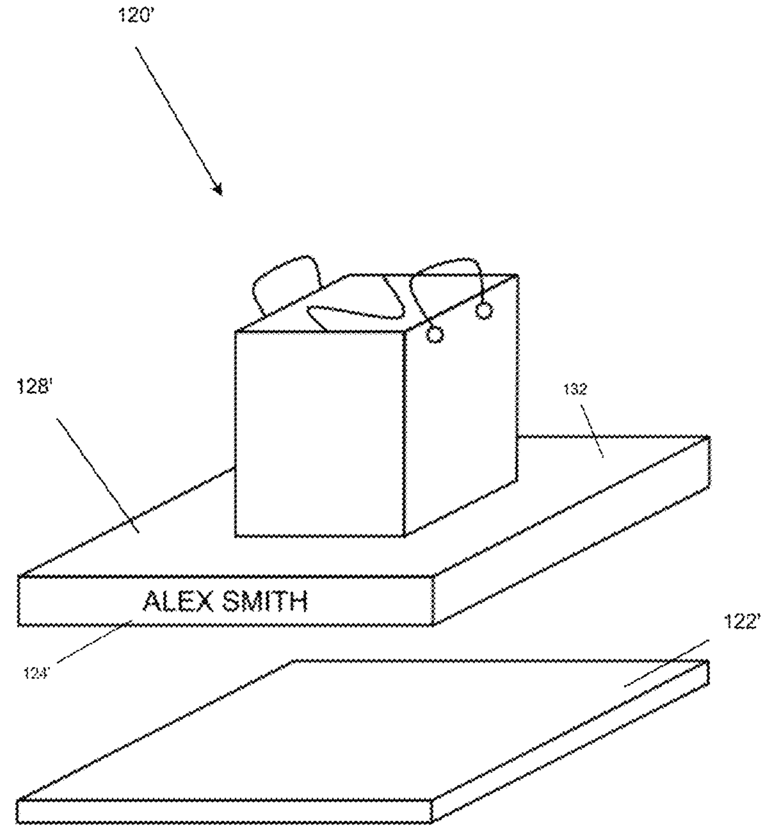
FIG. 19 depicts an exploded view of a modified smart pickup unit.
Figure 20:
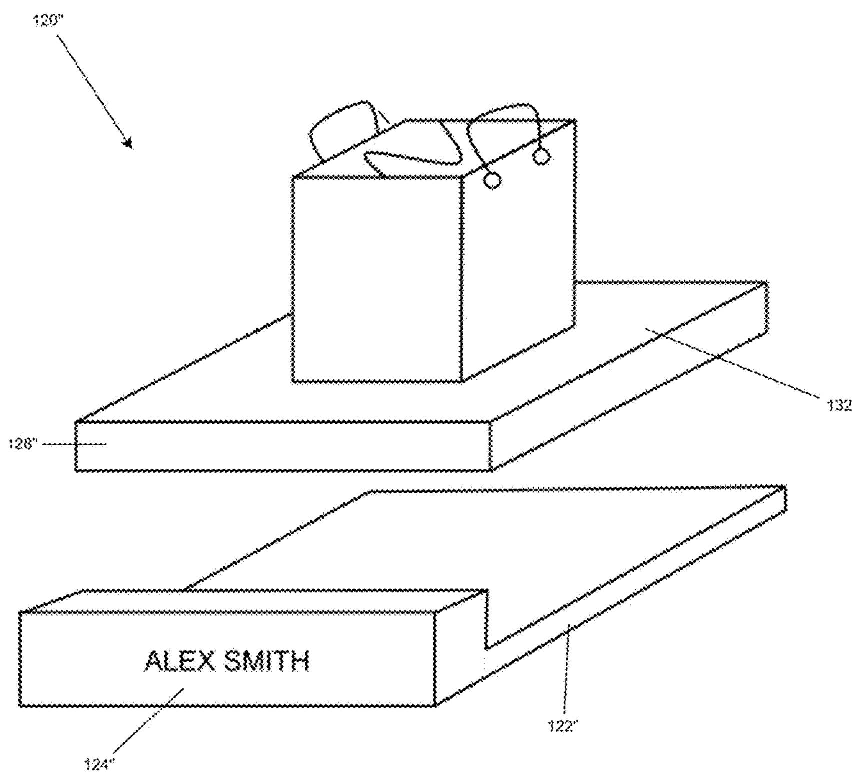
FIG. 20 depicts an exploded view of another modified smart pickup unit.
Figure 21:
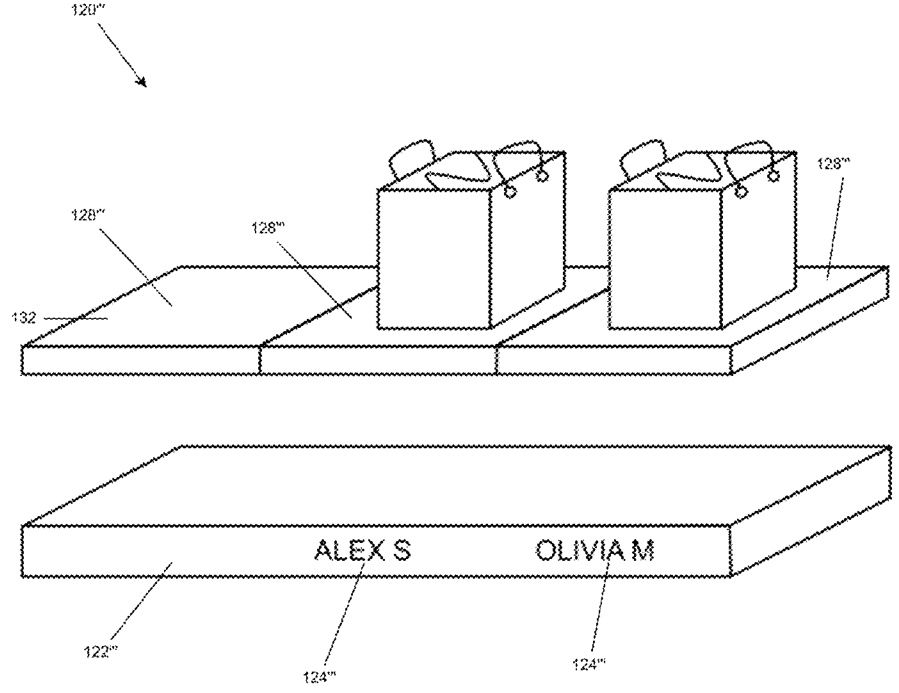
FIG. 21 depicts an exploded view of a modular configuration of multiple smart pickup units.

FIGS. 19, 20, and 21 illustrate modified embodiments of smart pickup units that demonstrate different configurations for distributing electronic components between the pad and base components. Each of these modified smart pickup units may be incorporated into any of the systems described herein in replacement of their respective smart pickup units, including smart pickup system (100), multi-unit smart pickup system (200), smart pickup multi-unit system (400), smart pickup countertop shelf system (500), smart pickup wall mounted system (600), smart pickup cabinet system (700), and smart pickup integrated system (800). It should be understood that these modified smart pickup units may include any of the features and functionality of the previously described smart pickup units, including but not limited to the sensors, microcontroller, user interface, and communication capabilities described in relation to smart pickup unit (101), smart pickup unit (120), smart pickup unit (300), etc. The features and components of the various smart pickup units described throughout this disclosure may be combined in any suitable manner as would be apparent to one skilled in the art in view of the teachings herein.

FIG. 19 illustrates an exploded view of a modified smart pickup unit (120') that represents a first configuration where substantially all electronic components are incorporated into the pad. Modified smart pickup unit (120') includes a modified base (122') that serves primarily for mechanical and electrical connectivity between units. A modified display (124') is positioned within the assembly to provide visual output capabilities. A modified pad (128') contains the majority of electronic components including sensors, microcontrollers, and processing capabilities. The modified pad (128') may house weight sensors (136), display circuitry (134), control unit (138), and communication lines (140) within its structure.

In this configuration, modified base (122') may function primarily as a structural support platform and facilitate connections with adjacent units through base coupling connectors (142). The modified base (122') may provide mechanical stability and enable electrical connectivity between multiple units in a modular arrangement. Power distribution may be managed through the modified pad (128'), with detachable cord (146) connecting to management device (144) to supply power to the entire system. This configuration allows for a self-contained smart pickup unit where the modified pad (128') operates independently while utilizing the modified base (122') for structural support and inter-unit connectivity.

FIG. 20 illustrates an exploded view of a modified smart pickup unit (120") that represents a second configuration where electronic components are distributed between the base and pad. Modified smart pickup unit (120") includes a modified base (122") that contains certain electronic components such as microcontrollers and display control systems. A modified display (124") may be integrated within the modified base (122") or positioned between the modified base (122") and modified pad (128"). The modified pad (128") may contain sensors and related sensing components while relying on the modified base (122") for processing and control functions.

In this distributed configuration, connectors (126) facilitate communication between electronic components housed in the modified base (122") and those incorporated into the modified pad (128"). The modified base (122") may serve as a central processing hub that manages multiple modified pads (128") simultaneously. This arrangement may enable a single modified base (122") to coordinate the operation of several sensing units, potentially reducing overall system complexity and cost while maintaining comprehensive monitoring capabilities across multiple pickup locations.

FIG. 21 illustrates an exploded view of a modified smart pickup unit (120") that demonstrates a modular configuration where multiple pads can be arranged on a single base platform. Modified smart pickup unit (120") includes a modified base (122") that extends horizontally to accommodate multiple modified pads (128"). Each modified pad (128") may incorporate its own sensors and local processing capabilities while communicating with a centralized control system housed within the modified base (122").

The modified base (122") may contain a row of modified displays (124") that correspond to each modified pad (128'") position. This configuration enables efficient space utilization and allows for coordinated monitoring of multiple orders simultaneously. The modified pads (128") may be positioned adjacent to each other along the length of the modified base (122"), with each pad maintaining independent sensing capabilities while sharing common processing and display resources through the modified base (122").

In some implementations, the modular configuration shown in FIG. 21 may enable clustering of multiple modified pads (128") to accommodate larger orders that span across multiple sensing areas. The system may recognize when a single order extends across multiple modified pads (128") and aggregate sensor data accordingly to provide comprehensive monitoring of the entire order. This clustering capability may provide flexibility in handling orders of varying sizes without requiring different sized pickup units.

Each of these modified configurations may offer distinct advantages depending on the specific application requirements. The configuration shown in FIG. 19 may provide maximum independence and modularity for individual pickup units. The configuration shown in FIG. 20 may offer efficient resource utilization through shared processing capabilities. The configuration shown in FIG. 21 may maximize space efficiency and enable handling of diverse order sizes through its modular pad arrangement.

All modified smart pickup units (120', 120", 120") may incorporate the same fundamental sensing, processing, and communication capabilities described throughout this specification, with the primary differences being the physical distribution of electronic components between the pad and base structures. The decorative film layer (132) may be applied to any of these configurations to provide the aesthetic and functional benefits described herein, including the ability to conceal displays when inactive while allowing information to appear when illuminated.

II. Data Aggregation and Analysis Services

In some aspects, the smart pickup systems described herein may be part of a larger data ecosystem managed by a service provider. This service provider may collect, aggregate, and analyze data from multiple smart pickup systems deployed across various food service establishments. The data collection may occur via cloud-based infrastructure, allowing for real-time data transmission and centralized processing.

The service provider may utilize this aggregated data for various purposes, including but not limited to:

1. Performance benchmarking across different establishments
2. Identifying industry-wide trends in order patterns and customer behavior
3. Optimizing algorithms for order accuracy prediction and theft prevention
4. Generating insights for inventory management and staff scheduling
5. Developing new features and services based on observed usage patterns 6. Creating anonymized reports for market research and business intelligence In some implementations, the service provider may offer tiered data services to food service establishments. Basic services may include standard system operation and maintenance, while premium tiers may offer advanced analytics, customized reports, and predictive modeling capabilities.

The data collected may encompass a wide range of parameters, such as:

Order volumes and peak times

Average wait times for order pickup

Frequency of order accuracy issues

Customer check-in and authentication patterns

Environmental data (e.g., temperature, humidity) affecting food quality

System utilization rates and capacity planning metrics

By leveraging machine learning and big data analytics techniques, the service provider may continually refine and improve the smart pickup system's performance across its entire network of deployed units. This may lead to ongoing enhancements in accuracy, efficiency, and user experience for both food service establishments and their customers.

In some aspects, the service provider may develop APIs (Application Programming Interfaces) that allow third-party developers to create additional services or integrations based on the aggregated data, further expanding the ecosystem around the smart pickup systems.

Privacy and data security measures may be implemented to ensure that sensitive information is protected and that data usage complies with relevant regulations and industry standards.

III. Illustrative Smart Pick Up Unit Configurations

As mentioned above, smart pickup units can be positioned on countertops, integrated into custom furniture, or arranged in modular configurations to suit specific operational needs. This versatility can enable restaurants to optimize their pickup areas for both efficiency and customer experience.

Figure 7:
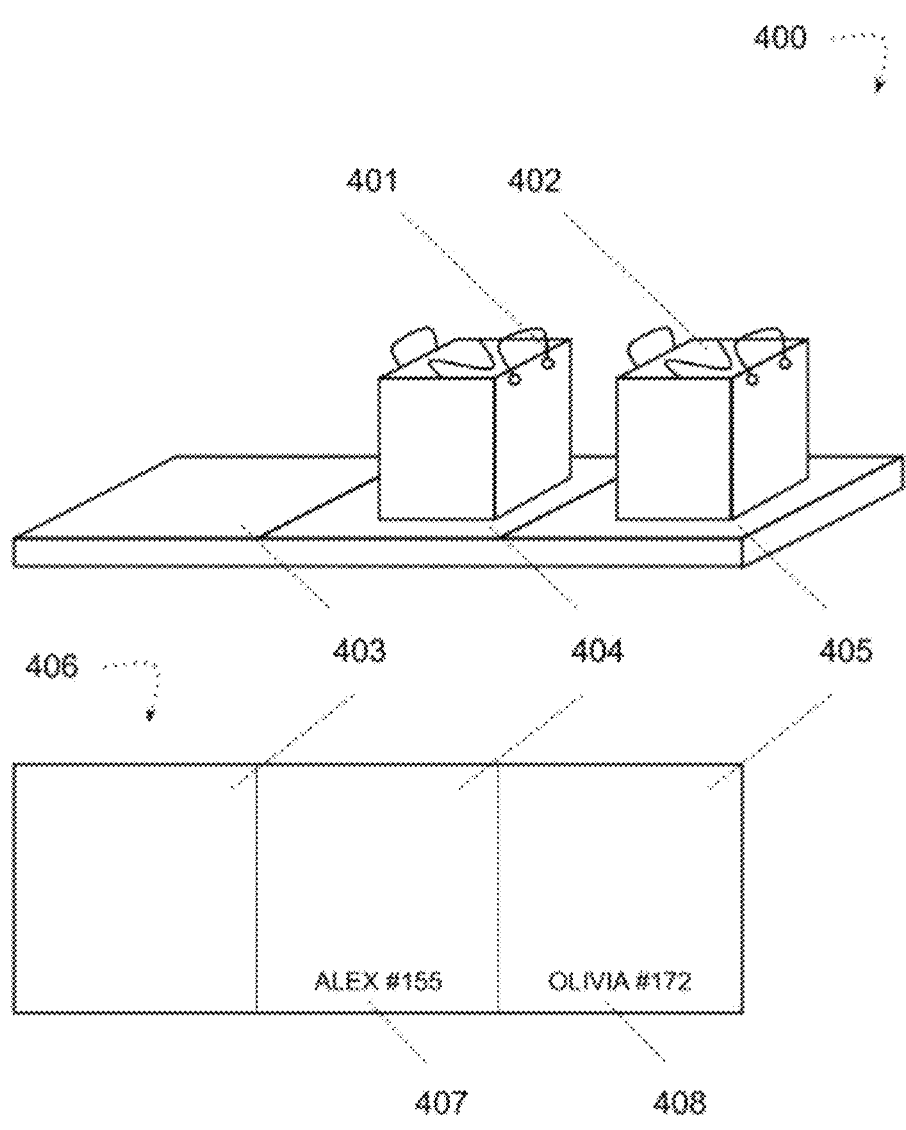
FIG. 7 depicts a perspective view of an illustrative smart pickup multi-unit system.

FIG. 7 illustrates a top view of a smart pickup multi-unit system (400). Smart pickup multi-unit system (400) includes multiple smart pickup units arranged in a horizontal configuration on a platform. Smart pickup multi-unit system (400) includes smart pickup unit (403), smart pickup unit (404), and smart pickup unit (405) positioned adjacent to each other. Each of these smart pickup units (403, 404, 405) can be substantially similar to the smart pickup units described above, such as smart pickup unit (101) of FIG. 1, smart pickup units (201, 202, 203) of FIG. 2, smart pickup unit (300) of FIG. 3, and/or smart pickup unit (120) of FIGS. 4-6, incorporating similar user interfaces, microcontrollers, sensors, and other components as described in connection with those units. Similar to system (200) described above, smart pickup multi-unit system (400) may incorporate smart pickup management software and be integrated with other devices and systems, enabling comprehensive order management and communication capabilities across the connected units. Additionally, the system may leverage clusters of multiple pads to accommodate a single larger order, such as a catering order or large pizza box. Instead of requiring restaurants to maintain different sizes of pads, the system allows multiple standard-sized pads arranged in a row or grid formation to function as a unified surface for supporting oversized orders. When multiple pads are clustered together for a single order, the system recognizes that the order spans across multiple pads and aggregates sensor data accordingly, maintaining accurate order verification while accommodating items of various dimensions.

During illustrative use, first order (401) and second order (402) can be positioned on smart pickup units (403) and (404) respectively, though it should be understood that these orders may be placed at any suitable location on any suitable smart pickup unit in accordance with the teachings herein. The configuration of orders and units depicted represents merely one exemplary arrangement among numerous possible permutations that may be implemented based on operational requirements, spatial constraints, or user preferences. Smart pickup units can include integrated displays, with display (406) positioned above smart pickup units, while display (407) and display (408) can be shown integrated within a lower portion of smart pickup multi-unit system (400).

Smart pickup units (403), (404), and (405) can be arranged in various configurations to accommodate different restaurant environments and operational needs. These units can be retrofitted onto existing countertops, integrated into custom cabinetry, mounted on walls to maximize vertical space utilization, or arranged in modular clusters to create dedicated pickup zones. The versatile design allows for seamless integration with existing restaurant infrastructure without requiring extensive renovations. For establishments with limited floor space, wall-mounted configurations provide an efficient solution that maintains customer accessibility while preserving valuable counter space. In high-volume environments, multiple units can be arranged in tiered configurations to optimize order organization while maintaining clear visibility of displays (406), (407), and (408), which provide critical order identification information. This adaptable system architecture enables restaurants to customize their pickup solution based on specific spatial constraints, customer flow patterns, and operational requirements.

Figure 8:
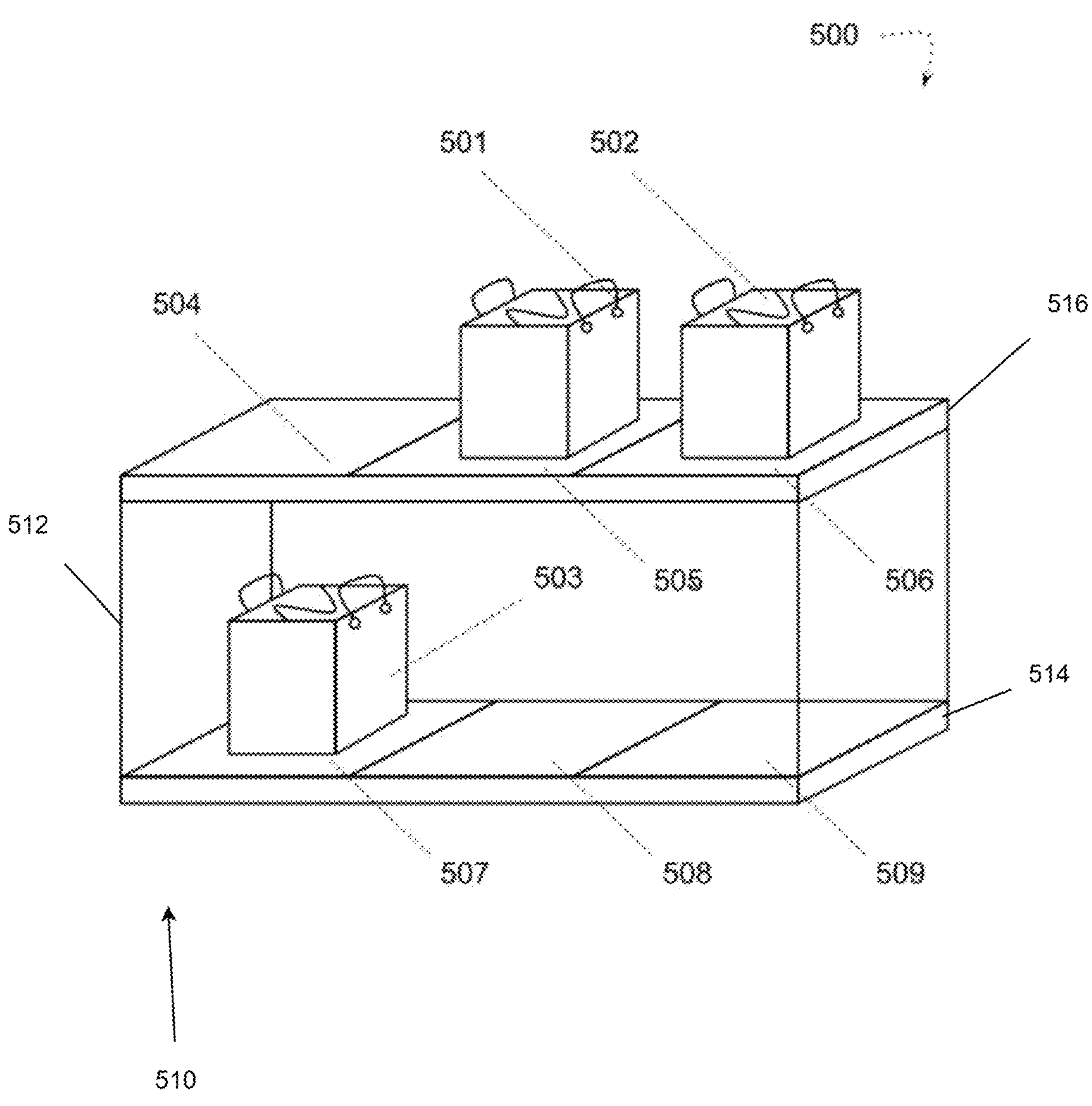
FIG. 8 depicts a perspective view of an illustrative smart pickup countertop shelf system.

FIG. 8 illustrates an isometric view of a smart pickup countertop shelf system (500). Smart pickup countertop shelf system (500) includes a countertop platform (514) that can serve as a base structure, with an elevated platform (516) positioned above countertop platform (514). Elevated platform (516) can support multiple smart pickup units arranged in two levels. Similar to system (200) described above, smart pickup countertop shelf system (500) may incorporate smart pickup management software and integrate with other devices and systems, allowing for centralized control and monitoring of all smart pickup units across both levels of the configuration. The system also supports clustering of adjacent smart pickup units to accommodate larger orders that exceed the dimensions of a single unit, with the system capable of recognizing when an order spans multiple units and aggregating sensor data accordingly.

An upper level of smart pickup countertop shelf system (500) can accommodate smart pickup unit (504), smart pickup unit (505), and smart pickup unit (506), which can be positioned side by side. Each of these smart pickup units (504, 505, 506) can be substantially similar to the smart pickup units described above, such as smart pickup unit (101) of FIG. 1, smart pickup units (201, 202, 203) of FIG. 2, smart pickup unit (300) of FIG. 3, and/or smart pickup unit (120) of FIGS. 4-6, incorporating similar user interfaces, microcontrollers, sensors, and other components as described in connection with those units. First order (501) and second order (502) can be shown placed on smart pickup units on an upper level, though it should be understood that these orders may be placed at any suitable location on any suitable smart pickup unit in accordance with the teachings herein.

A lower level can contain smart pickup unit (507), smart pickup unit (508), and smart pickup unit (509). Each of these smart pickup units (507, 508, 509) can be substantially similar to the smart pickup units described above, such as smart pickup unit (101) of FIG. 1, smart pickup units (201, 202, 203) of FIG. 2, smart pickup unit (300) of FIG. 3, and/or smart pickup unit (120) of FIGS. 4-6, incorporating similar user interfaces, microcontrollers, sensors, and other components as described in connection with those units. Third order (503) can be positioned on smart pickup unit (507), though it should be understood that this order may be placed at any suitable location on any suitable smart pickup unit in accordance with the teachings herein. Smart pickup units on both levels can provide surfaces for order placement and monitoring. Adjacent units on either level can function as clusters to accommodate larger orders that span multiple units, with the system recognizing when an order extends across multiple pads and processing the aggregated sensor data accordingly.

Smart pickup countertop shelf system (500) can include columns (512) that extend vertically from countertop platform (514) to support elevated platform (516). A countertop shelf (510) can provide additional structural support for an arrangement of smart pickup units.

These units can be retrofitted onto existing countertops, integrated into custom cabinetry, mounted on walls to maximize vertical space utilization, or arranged in modular clusters to create dedicated pickup zones. Smart pickup countertop shelf system (500) exemplifies an architecturally optimized configuration that strategically leverages vertical space through its multi-tiered design, thereby maximizing operational efficiency within spatially constrained restaurant environments. The tiered architecture further enables visual differentiation between order categories, potentially allowing staff to implement priority-based or time-sensitive order management protocols that optimize both food quality preservation and service delivery metrics.

Figure 9:
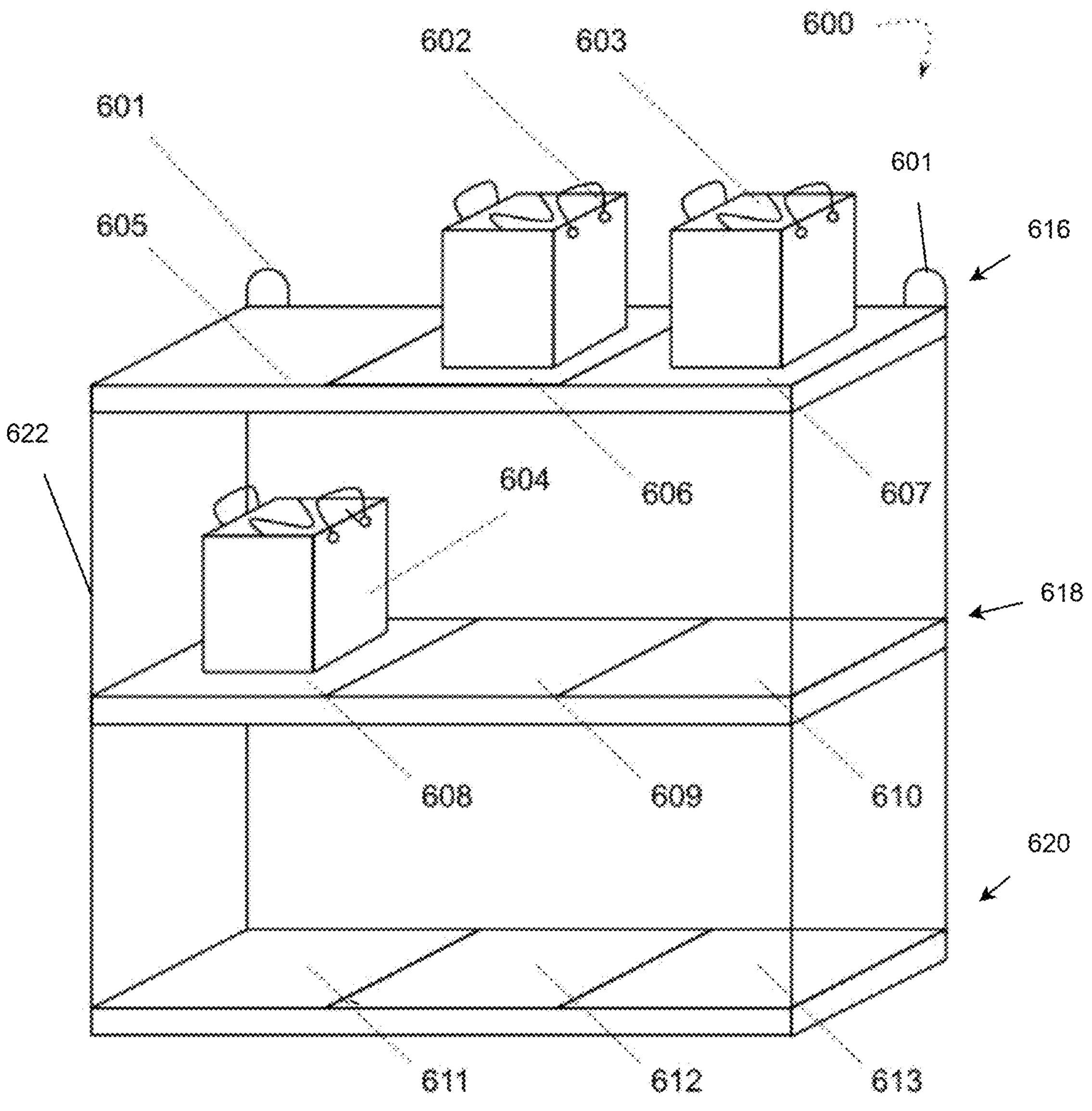
FIG. 9 depicts a perspective view of an illustrative smart pickup wall mounted system.

FIG. 9 illustrates an isometric view of a smart pickup wall mounted system (600). Smart pickup wall mounted system (600) can comprise three horizontal shelves arranged vertically—a top shelf (616), a middle shelf (618), and a bottom shelf (620). Shelves can be supported by columns (622) that provide structural stability and wall mounting capability through wall mount (601). Similar to system (200) described above, smart pickup wall mounted system (600) may incorporate smart pickup management software and integrate with external systems, enabling comprehensive management of multiple orders across all three shelf levels while maintaining communication with restaurant point-of-sale and other operational systems. The system supports clustering of adjacent smart pickup units to accommodate larger orders, allowing multiple units on the same shelf to function as a unified surface for oversized items while maintaining accurate order verification through aggregated sensor data.

Smart pickup wall mounted system (600) can include multiple smart pickup units arranged across three shelf levels. Top shelf (616) can accommodate three smart pickup units-smart pickup unit (605), smart pickup unit (606), and smart pickup unit (607). Middle shelf (618) can contain smart pickup unit (608), smart pickup unit (609), and smart pickup unit (610). Bottom shelf (620) can include smart pickup unit (611), smart pickup unit (612), and smart pickup unit (613).

Each of these smart pickup units (605, 606, 607, 608, 609, 610, 611, 612, 613) can be substantially similar to the smart pickup units described above, such as smart pickup unit (101) of FIG. 1, smart pickup units (201, 202, 203) of FIG. 2, smart pickup unit (300) of FIG. 3, and/or smart pickup unit (120) of FIGS. 4-6, incorporating similar user interfaces, microcontrollers, sensors, and other components as described in connection with those units. A first order (602), second order (603), and third order (604) can be positioned on smart pickup units on top shelf (616), middle shelf (618), and bottom shelf (620) respectively, though it should be understood that these orders may be placed at any suitable location on any suitable smart pickup unit in accordance with the teachings herein. Adjacent units on any shelf can function as clusters to accommodate larger orders that span multiple units, with the system recognizing when an order extends across multiple pads and processing the aggregated sensor data accordingly.

An arrangement can allow for efficient use of vertical wall space while maintaining accessibility to all smart pickup units across three shelf levels. A wall mounted configuration can enable smart pickup wall mounted system (600) to be installed without requiring floor space, with wall mount (601) providing secure attachment to a vertical surface. Columns (622) can extend between shelves to create a rigid structure that maintains proper spacing and alignment of smart pickup units.

Figure 10:
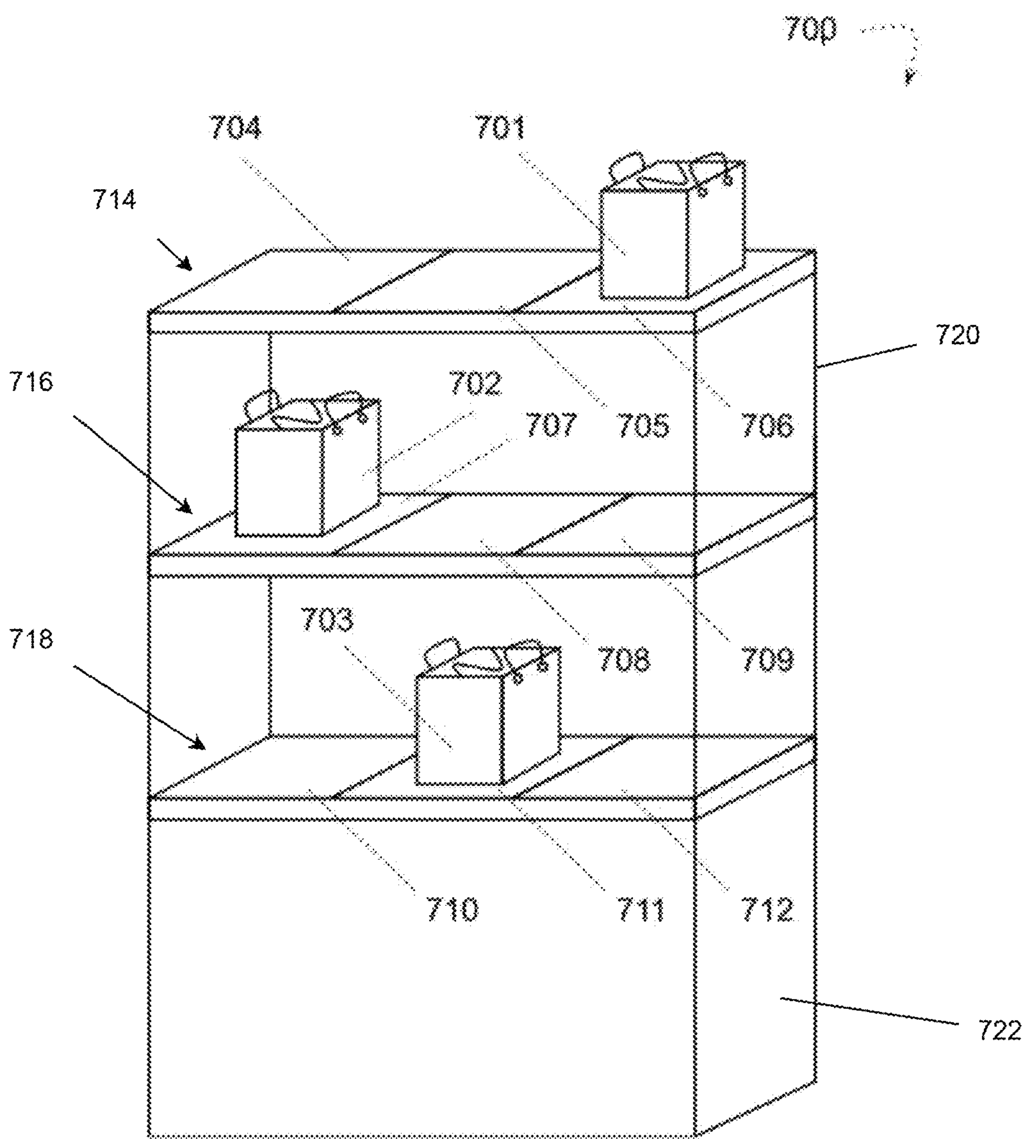
FIG. 10 depicts a perspective view of an illustrative smart pickup cabinet system.

FIG. 10 illustrates an isometric view of a smart pickup cabinet system (700). Smart pickup cabinet system (700) can include multiple smart pickup units arranged in a three-tier configuration supported by a column (720) and a countertop platform (722). Similar to system (200) described above, smart pickup cabinet system (700) may incorporate smart pickup management software and integrate with external systems and devices, enabling comprehensive order tracking and management across all three tiers while maintaining seamless communication with restaurant management systems. The system supports clustering of adjacent smart pickup units to accommodate larger orders, allowing multiple units on the same shelf to function as a unified surface for oversized items while maintaining accurate order verification through aggregated sensor data.

Smart pickup cabinet system (700) can comprise three shelves: a top shelf (714), a middle shelf (716), and a bottom shelf (718). Each shelf can support multiple smart pickup units arranged horizontally. Top shelf (714) can accommodate smart pickup unit (704), smart pickup unit (705), and smart pickup unit (706). Middle shelf (716) can support smart pickup unit (707), smart pickup unit (708), and smart pickup unit (709). Bottom shelf (718) can contain smart pickup unit (710), smart pickup unit (711), and smart pickup unit (712). Each of these smart pickup units (704, 705, 706, 707, 708, 709, 710, 711, 712) can be substantially similar to the smart pickup units described above, such as smart pickup unit (101) of FIG. 1, smart pickup units (201, 202, 203) of FIG. 2, smart pickup unit (300) of FIG. 3, and/or smart pickup unit (120) of FIGS. 4-6, incorporating similar user interfaces, microcontrollers, sensors, and other components as described in connection with those units.

Smart pickup cabinet system (700) can be shown with three orders positioned on different units. A first order (701), second order (702), and third order (703) can be positioned on smart pickup units on top shelf (714), middle shelf (716), and bottom shelf (718) respectively, though it should be understood that these orders may be placed at any suitable location on any suitable smart pickup unit in accordance with the teachings herein. Adjacent units on any shelf can function as clusters to accommodate larger orders that span multiple units, with the system recognizing when an order extends across multiple pads and processing the aggregated sensor data accordingly.

Column (720) can provide vertical support for a shelving structure, while countertop platform (722) can serve as a base for an entire system. An arrangement can allow for efficient use of vertical space while maintaining accessibility to all smart pickup units. A configuration can enable multiple orders to be managed simultaneously across different levels of smart pickup cabinet system (700).

In some cases, smart pickup multi-unit system (400), smart pickup countertop shelf system (500), smart pickup wall mounted system (600), and smart pickup cabinet system (700) can be retrofitted to existing shelving or counter systems in a restaurant or food service environment. This adaptability can allow businesses to integrate smart pickup capabilities into their current infrastructure without requiring extensive renovations or replacements of existing furniture.

For example, smart pickup units can be designed with standardized dimensions and mounting mechanisms that allow them to be easily installed on existing shelves or countertops. In some implementations, smart pickup units can include adjustable mounting brackets or adapters that can accommodate various shelf thicknesses or configurations.

When retrofitting an existing shelving system, power and data connections for smart pickup units can be routed through existing structural elements or concealed within custom-designed cable management solutions. This approach can minimize visible wiring and maintain a clean, professional appearance in customer-facing areas.

In cases where existing countertops are utilized, smart pickup units can be designed with low-profile bases that can be securely attached to the counter surface without requiring permanent modifications. This can allow for flexible placement and easy reconfiguration as business needs change over time.

IV. Illustrative Smart Pickup System Integration

Figure 11:
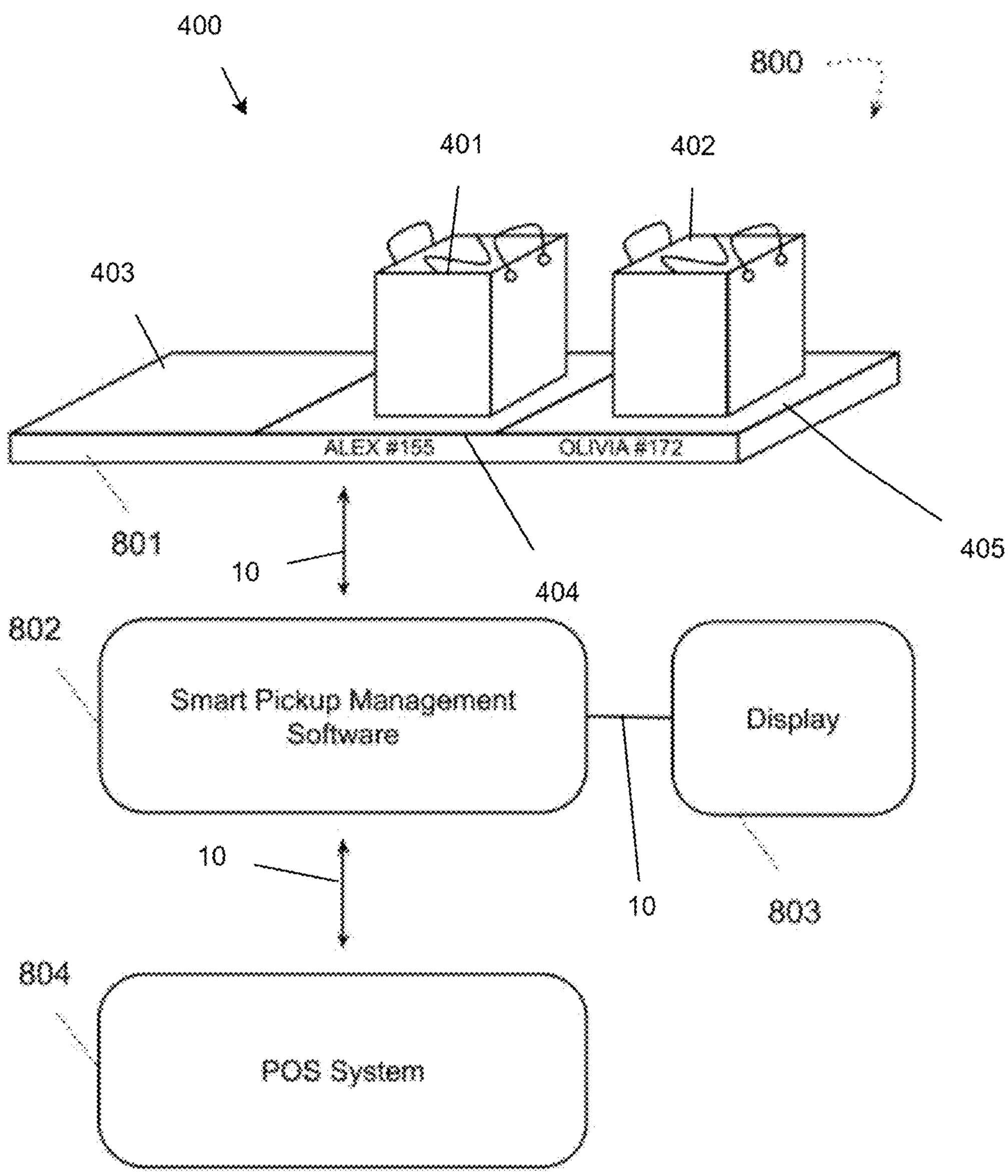
FIG. 11 depicts a block diagram of a smart pickup integrated system, according to aspects of the present disclosure.

In addition to the various physical configurations discussed above, smart pickup systems may be integrated with other software and devices to create a comprehensive order management ecosystem. As mentioned earlier, these systems can interface with existing restaurant technologies to enhance operational efficiency and customer experience. FIG. 11 provides an illustrative example of how system (400) may be integrated into a representative work environment. It should be understood that any other smart pickup system described herein may be incorporated into this illustrative work environment, as the integration capabilities are not limited to a specific physical configuration. This flexibility allows restaurants to select the most suitable smart pickup system for their space while still benefiting from seamless integration with their existing technological infrastructure.

FIG. 11 illustrates a block diagram of a smart pickup integrated system (800). The system includes a smart pickup platform (801) that supports multiple smart pickup units. In the current example, since system (400) described above is being utilized in smart pickup integrated system (800), smart pickup platform (801) includes smart pickup unit (403), smart pickup unit (404), and smart pickup unit (405).

Smart pickup integrated system (800) includes smart pickup management software (802) that communicates with smart pickup platform (801) through communication lines (10). Smart pickup management software (802) may serve as a central control component, coordinating operations across multiple smart pickup units. Smart pickup management software (802) can be substantially similar to the other management software described above, such as smart pickup management software (107) in FIG. 1 and smart pickup management software (204) in FIG. 2, incorporating similar functionality for coordinating smart pickup units and integrating with external systems.

A display (803) is connected to smart pickup management software (802) via communication line (10). Display (803) may comprise various implementations, such as a kitchen order monitoring system, an iPad or tablet device positioned at a service counter, a dedicated touchscreen monitor, or even multiple displays strategically positioned throughout the restaurant environment. These displays provide comprehensive visual information related to order status, customer details, pickup times, and other operational metrics. Staff can monitor real-time status of all smart pickup units simultaneously, including which units are occupied, which orders are ready for pickup, which orders may be approaching temperature or time thresholds, and which customers have arrived for pickup. The display (803) may also serve as an interactive interface that enables staff to provide input interaction with the smart pickup units, such as performing single clicks, double clicks, taps, double taps, or other touch gestures to override incorrect alerts or provide system feedback. This capability complements the touch-sensitive elements integrated into the smart pickup units themselves, providing multiple avenues for staff interaction and system control. The display (803) may be configured with customizable views allowing staff to sort orders by preparation time, pickup time, or priority level. In multi-station kitchens, different displays could be dedicated to specific preparation areas while maintaining synchronized data across all displays. This robust display system enables staff to proactively manage the entire order fulfillment process, anticipate customer arrivals, and ensure optimal food quality and service timing while maximizing the efficiency of the smart pickup units.

In some implementations, one or more displays in the smart pickup integrated system (800) may be dedicated for customer use. These customer-facing displays may provide valuable information and interactive features to enhance the pickup experience.

For example, a customer-oriented display may show a queue of orders, estimated preparation times, and pickup status updates. This information can help customers gauge their wait times and plan their arrivals accordingly. The display may also show promotional content, menu specials, or other relevant information when not actively displaying order details.

In one instance, the customer-facing display may implement a secure order retrieval system using a name and passcode mechanism. When an order is ready for pickup, the display may show the customer's name along with a unique, temporary passcode. The customer can then input this passcode into their mobile device, which communicates with the smart pickup management software (802).

Upon receiving the correct passcode, the smart pickup management software (802) may activate the specific smart pickup unit containing the customer's order. This activation could involve illuminating the unit, unlocking a secure compartment, or displaying the customer's name on the unit's individual display. This approach may provide an additional layer of security and accuracy in the order pickup process, reducing the likelihood of orders being retrieved by the wrong customers.

The passcode system may also be integrated with the restaurant's mobile application. In this case, customers may receive push notifications with their passcodes when their orders are ready, streamlining the pickup process and reducing the need for customers to continuously monitor the in-store display.

Additionally, the customer-facing display may offer interactive features such as the ability to check order status by entering an order number, view nutritional information for ordered items, or even place additional orders for quick preparation. These functionalities may help reduce staff workload while empowering customers with self-service options.

Smart pickup integrated system (800) also includes a POS system (804) that communicates with smart pickup management software (802) through communication line (10). While POS system (804) may integrate order processing and payment functions with smart pickup management software (802), allowing for seamless order tracking and fulfillment, the smart pickup integrated system (800) can be designed to interface with multiple types of establishment systems simultaneously. These integrated systems may include, but are not limited to: (1) kitchen display systems (KDS) that show order details to kitchen staff; (2) inventory management systems that track ingredient usage and stock levels; (3) customer relationship management (CRM) platforms that store customer preferences and order history; (4) third-party delivery service APIs that coordinate with external delivery providers; (5) mobile ordering applications that allow customers to place orders remotely; (6) employee scheduling systems that optimize staffing based on order volume; (7) digital menu boards that display real-time availability; and (8) loyalty program databases that track customer rewards. The smart pickup integrated system (800) can maintain concurrent connections with multiple systems, enabling comprehensive data exchange across the entire restaurant technology ecosystem rather than being limited to a single integration point.

In some implementations, smart pickup platform (801) may incorporate volume sensors for 3D measurement of package dimensions. These sensors may be integrated into individual smart pickup units or positioned within smart pickup platform (801) itself. Volume sensors may enable accurate measurement of order sizes, assisting in order verification and space optimization on smart pickup platform (801).

Smart pickup management software (802) may process data from volume sensors, combining this information with other sensor inputs to create a comprehensive understanding of each order's characteristics. This multi-sensor approach may enhance order accuracy verification and improve overall system efficiency.

Communication lines (10) facilitate data exchange between components of smart pickup integrated system (800). These communication pathways may utilize wired or wireless technologies, enabling flexible system configurations to suit various restaurant layouts and operational needs.

Smart pickup integrated system (800) may provide a comprehensive order management solution by integrating order processing, pickup management, and customer service functions. The combination of smart pickup platform (801), smart pickup management software (802), display (803), and POS system (804) may create a streamlined workflow for both staff and customers, potentially improving operational efficiency and customer satisfaction in food service environments.

V. Illustrative Methods

Figure 12:
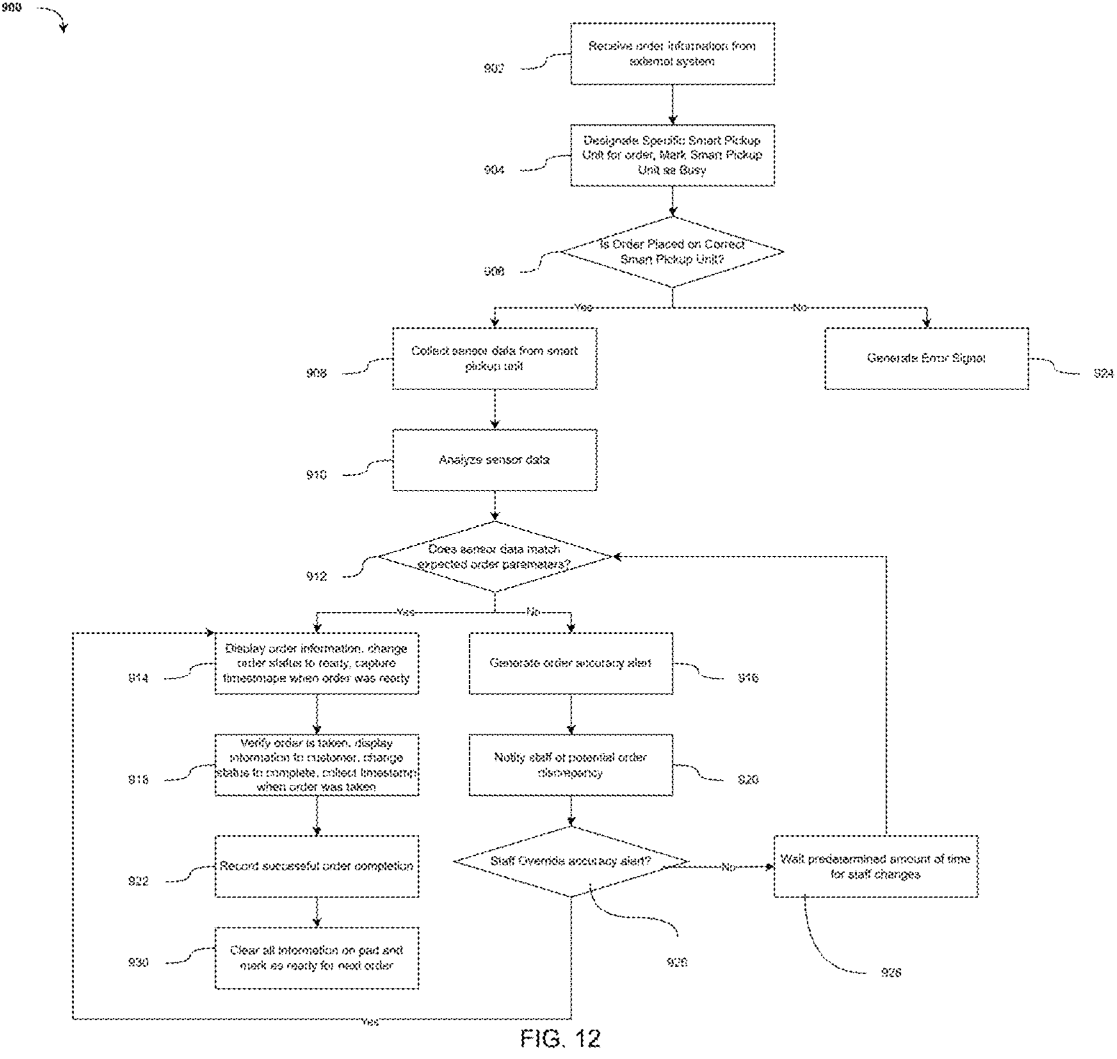
FIG. 12 depicts a flowchart for an illustrative order accuracy verification process.

FIG. 12 illustrates a flowchart for an order accuracy verification process in a modular smart pickup system (900). Process (900) may be performed by any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800).

Process (900) begins at step (902), where order information is received from an external system. This information may be received from various sources including a POS system, a mobile ordering application, a kitchen display system (KDS), a line ordering system, or any other suitable external system that can trigger the event. The information may relate to various events such as order placement, order readiness notification from the kitchen, or any other suitable event that would initiate the order distribution process as would be apparent to one skilled in the art in view of the teachings herein.

Process (900) then moves to step (904), where a specific smart pickup unit is designated for an order and marked as busy in the system to prevent distribution of other orders to this pad. During this step, the designated smart pickup unit may light up to indicate which smart unit a completed order should be placed on. In some instances, the smart pickup unit may display the order number, customer name, or other order identifier to help staff understand which order should be placed on that specific pad. Additionally, the pad number may be shown on an external display system used by staff, or both approaches may be used simultaneously to provide clear guidance for order placement. This is particularly useful when multiple orders are being prepared simultaneously, as it helps staff correctly match each order with its designated pickup unit.

Once an order is thought to be completed, an employee may place the completed order onto the designated smart unit. Process (900) proceeds to step (906), which determines if an order is placed on a correct smart pickup unit.

If an order is not placed on a correct smart pickup unit at step (906) (No branch), process (900) moves to step (924), where an error signal is generated. In some cases, a smart pickup unit may allow for staff override of incorrect alerts through double or triple tapping on a pad surface of a smart pickup unit. This feature may provide flexibility in cases where sensor data may not accurately reflect an order's contents due to factors such as unusual packaging or non-standard item combinations.

If an order is placed on a correct unit (Yes branch), process (900) moves to step (908), where sensor data is collected from a smart pickup unit. Process (900) then continues to step (910), where sensor data is analyzed.

At step (912), process (900) determines whether sensor data matches expected order parameters. This determination can involve a single-parameter or multi-parameter analysis utilizing data from various sensors within the smart pickup unit. The expected order parameters can be initially established based on historical data stored in the system for similar order types, which may include standard weight ranges, typical temperature profiles, expected dimensions, and/or characteristic weight distributions for specific menu items. These baseline parameters can then refined through machine learning algorithms that analyze patterns from previous orders, as described in method (1200). In one aspect, the system compares the actual weight measurements from weight sensors (136) positioned at strategic locations around the perimeter of the base (122), which provide precise data about both total weight and weight distribution across the smart pickup unit. In some instances, temperature readings, humidity levels, and other environmental factors can be detected by specialized sensors and incorporated into the analysis. The system may also utilize computer vision capabilities through ceiling-mounted cameras to further verify order contents. If a parameter falls outside its acceptable range—which may be dynamically adjusted based on order type, environmental conditions, and historical performance data—the system flags the potential discrepancy for further verification.

If sensor data matches expected parameters (Yes branch), process (900) moves to step (914), where order information is displayed, order status is changed to ready, and a timestamp is captured when the order was ready. In some instances, such as when security features are present, such display may be delayed until further action by the customer is completed, such as authentication via mobile app, QR code scanning, or other verification methods.

Process (900) then proceeds to step (918), where the order is verified as taken, information is displayed to the customer, status is changed to complete, and a timestamp is collected when the order was taken. Following verification, process (900) moves to step (922), where successful order completion is recorded. The process then continues to step (930), where all information on the pad is cleared and marked as ready for the next order.

If sensor data does not match expected parameters at step (912) (No branch), process (900) moves to step (916), where an order accuracy alert is generated. Process (900) then proceeds to step (920), where staff are notified of a potential order discrepancy.

From step (920), the process moves to step (926), which determines if staff override the accuracy alert. This override feature allows staff members to confirm that an order is accurate even when the system has flagged it as potentially incorrect, which may occur in cases where sensor data does not accurately reflect an order's contents due to factors such as unusual packaging or non-standard item combinations. Staff may override incorrect alerts through specific gestures such as double or triple tapping on the surface of the smart pickup unit. If staff override the alert (Yes branch), the process returns to step (914), and the system records this override to help the machine learning algorithm refine its parameters based on real-world data. If staff do not override the alert (No branch), the process moves to step (928), where the system waits a predetermined amount of time before returning to step (912) to reanalyze the sensor data.

Process (900) demonstrates a verification process that incorporates sensor data analysis and staff notification capabilities for maintaining order accuracy. Process (900) includes multiple decision points that evaluate both order placement location and order parameter compliance, allowing for comprehensive order verification at various stages of order fulfillment.

Figure 13:
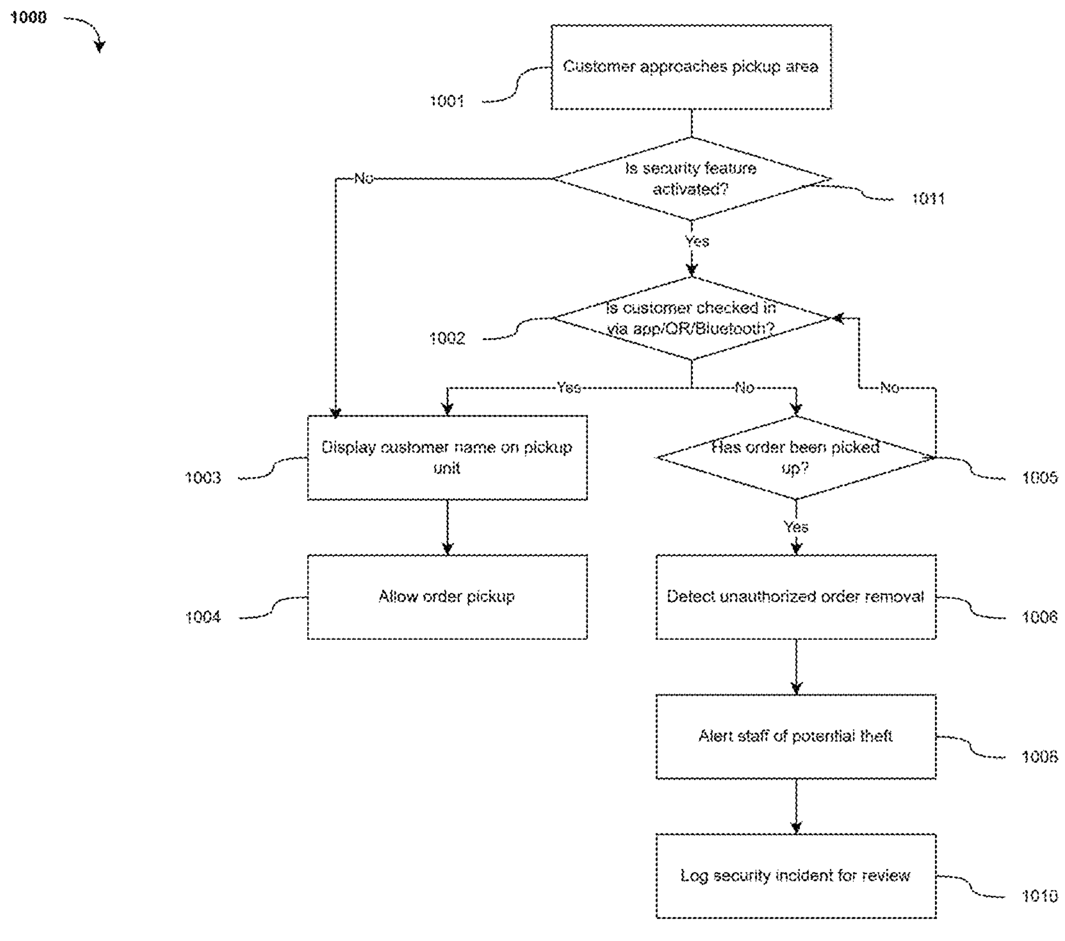
FIG. 13 depicts a flowchart for an illustrative customer order pickup verification method.

FIG. 13 illustrates a flowchart for a customer order pickup verification method (1000). Method (1000) may be implemented in any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800). Method (1000) includes steps for verifying customer identity and monitoring order removal.

Method (1000) begins at step (1001), where a customer approaches a pickup area. At this point, the customer's order may already be correctly placed on a designated smart pickup unit, awaiting potential authentication and retrieval. Method (1000) then moves to step (1011), which determines if a security feature is activated. This security feature is optional and can be enabled or disabled by staff based on operational preferences. If the security feature is activated, the process continues to step (1002), which determines if a customer is checked in via app/QR/Bluetooth. This check-in can occur through multiple authentication methods including: scanning a QR code displayed on the smart pickup unit with their mobile device; using near-field communication (NFC) technology on their mobile device; entering a unique pickup code on their mobile device or at a kiosk; using Bluetooth proximity detection when their registered mobile device comes within range of the smart pickup unit; using Bluetooth beacon technology that allows for more precise geolocation positioning than standard Bluetooth; facial recognition through ceiling-mounted cameras integrated with the system; receiving and responding to a push notification sent to their mobile device when their order is ready; or presenting a digital or physical receipt with order identification information.

If a customer is checked in (Yes branch from step (1002)), or if the security feature is not activated (No branch from step (1011)), method (1000) proceeds to step (1003), where the customer name is displayed on the pickup unit. This display allows the customer to identify which order belongs to them among potentially multiple orders on different smart pickup units. Method (1000) then moves to step (1004), where order pickup is allowed. During this step, the customer may identify their order based on the displayed name and remove it from the smart pickup unit. In some instances, staff may be notified of pickup activities, though this notification is optional and may not occur in all implementations.

The security feature referenced in step (1003) is an optional feature that business establishments can activate or deactivate according to their operational preferences. When activated, this "invisible lock" security feature requires customer authentication before displaying order information, providing an additional layer of security against unauthorized order removal. When deactivated, customer names or order numbers are displayed by default without requiring authentication, which may be preferable during periods of lower theft risk or when prioritizing faster customer throughput. This flexibility allows restaurants and other establishments to adjust their security protocols based on factors such as time of day, location characteristics, or current staffing levels.

If a customer is not checked in at step (1002) (No branch) and the security feature is activated, method (1000) moves to step (1005), which determines if an order has been picked up. This step involves monitoring for unauthorized order removal.

If an order has been picked up (Yes branch from step (1005)), method (1000) proceeds to step (1006), where unauthorized order removal is detected. Method (1000) then advances to step (1008), where staff are alerted of potential theft. Following alert generation, method (1000) moves to step (1010), where the security incident is logged for review.

If at step (1005) an order has not been picked up (No branch), method (1000) returns to step (1002) to check if a customer has completed check-in. This loop allows for continuous monitoring of order status and customer authentication when the security feature is activated.

The ability to toggle the security feature on or off provides operational flexibility for businesses. Staff can activate the feature during high-risk periods or in locations with higher incidence of order theft, then deactivate it during peak business hours when throughput efficiency is prioritized and staff presence naturally deters theft. This adaptability allows the smart pickup system to balance security concerns with operational efficiency based on the specific needs of each establishment and changing conditions throughout the day.

Figure 14:
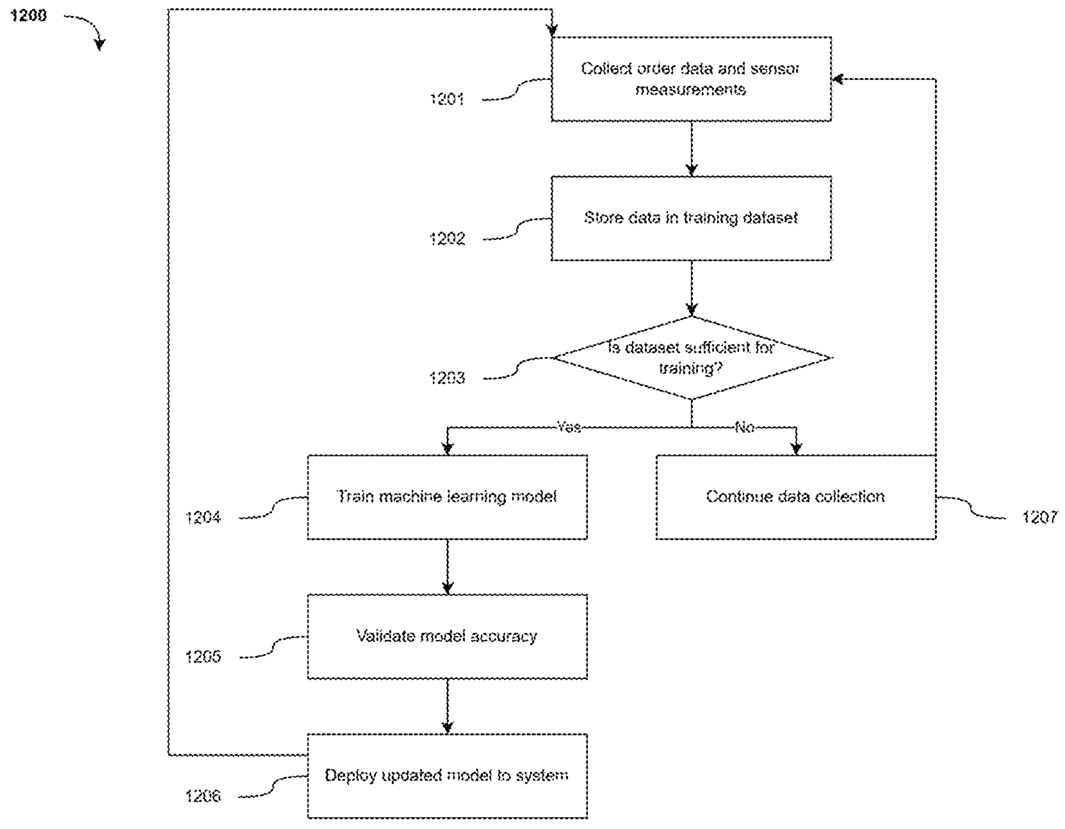
FIG. 14 depicts a flowchart for an illustrative machine learning training method.

FIG. 14 illustrates a flowchart for a machine learning training method (1200) that may be implemented in any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800). Method (1200) begins at step (1201), where order data and sensor measurements are collected from smart pickup units. This data collection step may involve gathering information such as order weights, temperatures, pickup times, and other relevant parameters from sensors integrated into smart pickup units.

In step (1202), collected data is stored in a training dataset. This dataset may serve as a repository of historical order information and corresponding sensor readings, providing a foundation for machine learning algorithms to analyze patterns and trends.

Method (1200) proceeds to step (1203), which determines if a dataset is sufficient for training. This determination may be based on factors such as dataset size, diversity of order types, and representation of various environmental conditions. If a dataset is deemed insufficient (No branch), method (1200) moves to step (1207), where data collection continues. From step (1207), process returns to step (1201) to collect and store additional collected data in a training dataset.

If a dataset is determined to be sufficient (Yes branch), method (1200) continues to step (1204), where a machine learning model is trained using collected data. This training process may involve algorithms such as neural networks or decision trees to identify patterns and relationships within order data and sensor measurements.

After model training, method (1200) advances to step (1205), where model accuracy is validated. This validation step may involve testing a trained model against a separate dataset to ensure its predictive capabilities meet desired performance criteria.

Method (1200) then moves to step (1206), where an updated model is deployed to a system. This deployment may involve integrating a trained and validated model into smart pickup management software, allowing it to inform decision-making processes in real-time operations. From step (1206), process returns to step (1201) to collect and store additional collected data in a training dataset.

Figure 15:
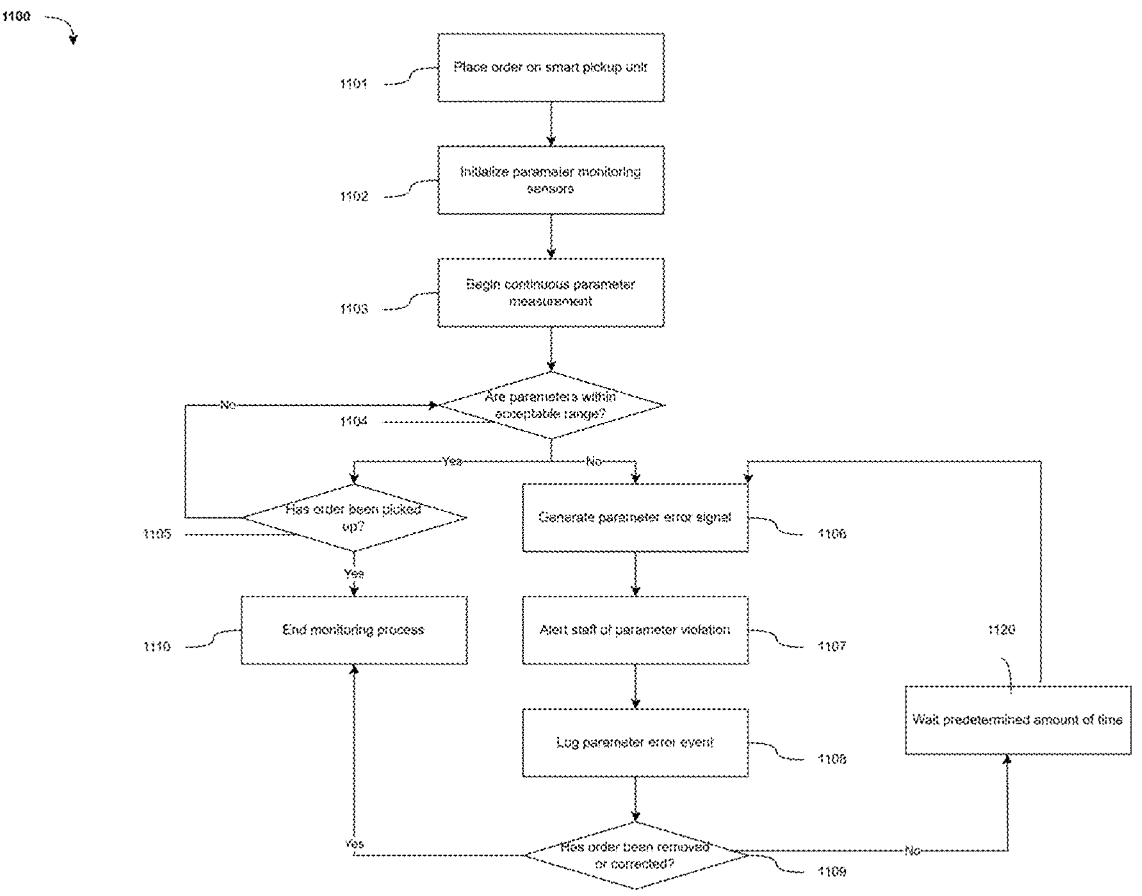
FIG. 15 depicts a flowchart for an illustrative parameter monitoring method.

FIG. 15 illustrates a flowchart for a parameter monitoring method (1100) that may be implemented in any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800). Method (1100) begins at step (1101), where an order is placed on a smart pickup unit. This placement may trigger initialization of parameter monitoring sensors in step (1102).

Following initialization, method (1100) proceeds to step (1103), where continuous parameter measurement begins. These parameters may include weight, temperature, humidity, or other relevant factors that can affect order quality or accuracy.

Method (1100) then advances to step (1104), which determines if parameters are within an acceptable range. These ranges may be dynamically adjusted based on order type, ambient conditions, or learned patterns from machine learning models.

If parameters are within range (Yes branch), method (1100) moves to step (1105), which determines if an order has been picked up. If an order has been picked up (Yes branch), method (1100) proceeds to step (1110), where a monitoring process ends.

If parameters are not within range (No branch), method (1100) moves to step (1106), where a parameter error signal is generated. The flow then continues to step (1107), where staff are alerted of the parameter violation. Following the alert, the process advances to step (1108), where the parameter error event is logged. From step (1108), the process moves to step (1109), which determines if the order has been removed or corrected. If the order has been removed or corrected (Yes branch), the process proceeds to step (1110), where the monitoring process ends. If the order has not been removed or corrected at step (1109) (No branch), the process moves to step (1120), where the system waits a predetermined amount of time before returning to step (11065) to generate an error signal until the issue has been addressed.

Figure 16:
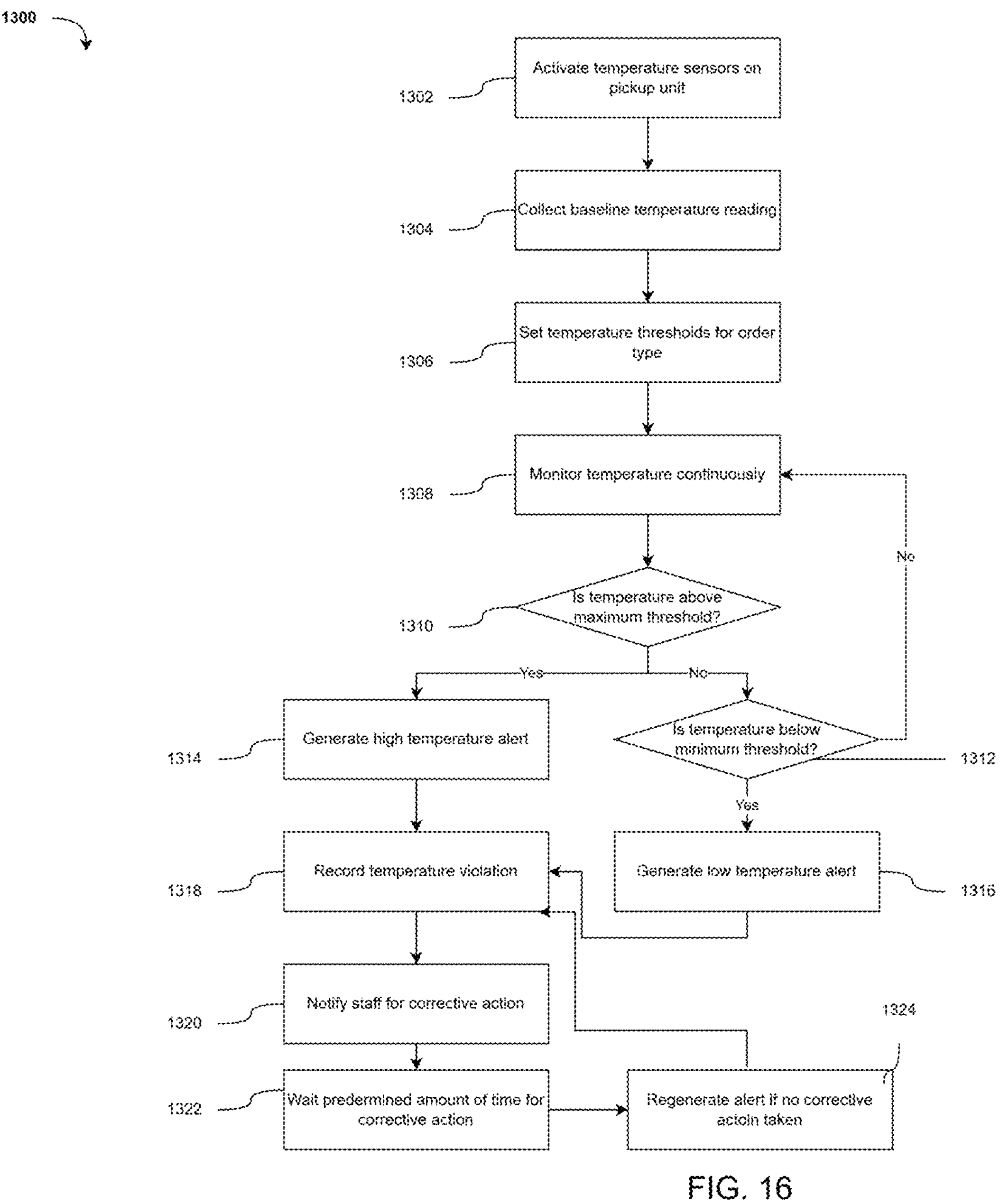
FIG. 16 depicts a flowchart for an illustrative temperature monitoring method.

FIG. 16 illustrates a flowchart for a temperature monitoring method (1300) that may be implemented in any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800). Method (1300) begins at step (1302), where temperature sensors on a pickup unit are activated. This activation may occur when an order is placed or in anticipation of order placement.

Following sensor activation, method (1300) proceeds to step (1304), where a baseline temperature reading is collected. This baseline may serve as a reference point for subsequent temperature monitoring.

Method (1300) then advances to step (1306), where temperature thresholds are set for an order type. These thresholds may be dynamically adjusted based on factors such as food type, expected wait time, or ambient conditions.

From step (1306), method (1300) moves to step (1308), where temperature is monitored continuously. This ongoing monitoring allows for real-time assessment of order temperature conditions. The process then advances to step (1310), which determines if the temperature exceeds a maximum threshold. This maximum threshold may be predetermined based on food safety standards, order type, or customer preferences. If the temperature is above the maximum threshold (Yes branch), the process proceeds to step (1314), where a high temperature alert is generated. This alert may include visual indicators on the smart pickup unit, notifications to staff mobile devices, or audible warnings in the kitchen area.

If the temperature is not above the maximum threshold at step (1310) (No branch), the process moves to step (1312), which determines if the temperature has fallen below a minimum threshold. This minimum threshold may vary depending on whether the order contains hot or cold items, with different acceptable temperature ranges for different food categories. If the temperature is below the minimum threshold (Yes branch), the process proceeds to step (1316), where a low temperature alert is generated. This alert functions similarly to the high temperature alert but indicates that the order may be becoming too cold rather than too hot.

If the temperature remains within the acceptable range between minimum and maximum thresholds (No branch from step (1312)), the process returns to step (1308) to continue temperature monitoring until the order is picked up.

From both step (1314) and step (1316), the process advances to step (1318), where the temperature violation is recorded in the system database. This recording includes the specific temperature reading, time of violation, order details, and duration of the out-of-range condition. The method (1300) then proceeds to step (1320), where staff are notified for corrective action. This notification includes specific instructions based on the type of temperature violation, such as replacing the order, expediting delivery to the customer, or adjusting the order's position on the smart pickup unit to modify its temperature exposure. Following staff notification, the process advances to step (1322), where the system waits a predetermined amount of time for corrective action to be taken. The process then moves to step (1324), where the alert is regenerated if no corrective action has been taken, creating a loop that ensures temperature violations are addressed. This loop continues until either corrective action is taken or the order is removed from the smart pickup unit.

Figure 17:
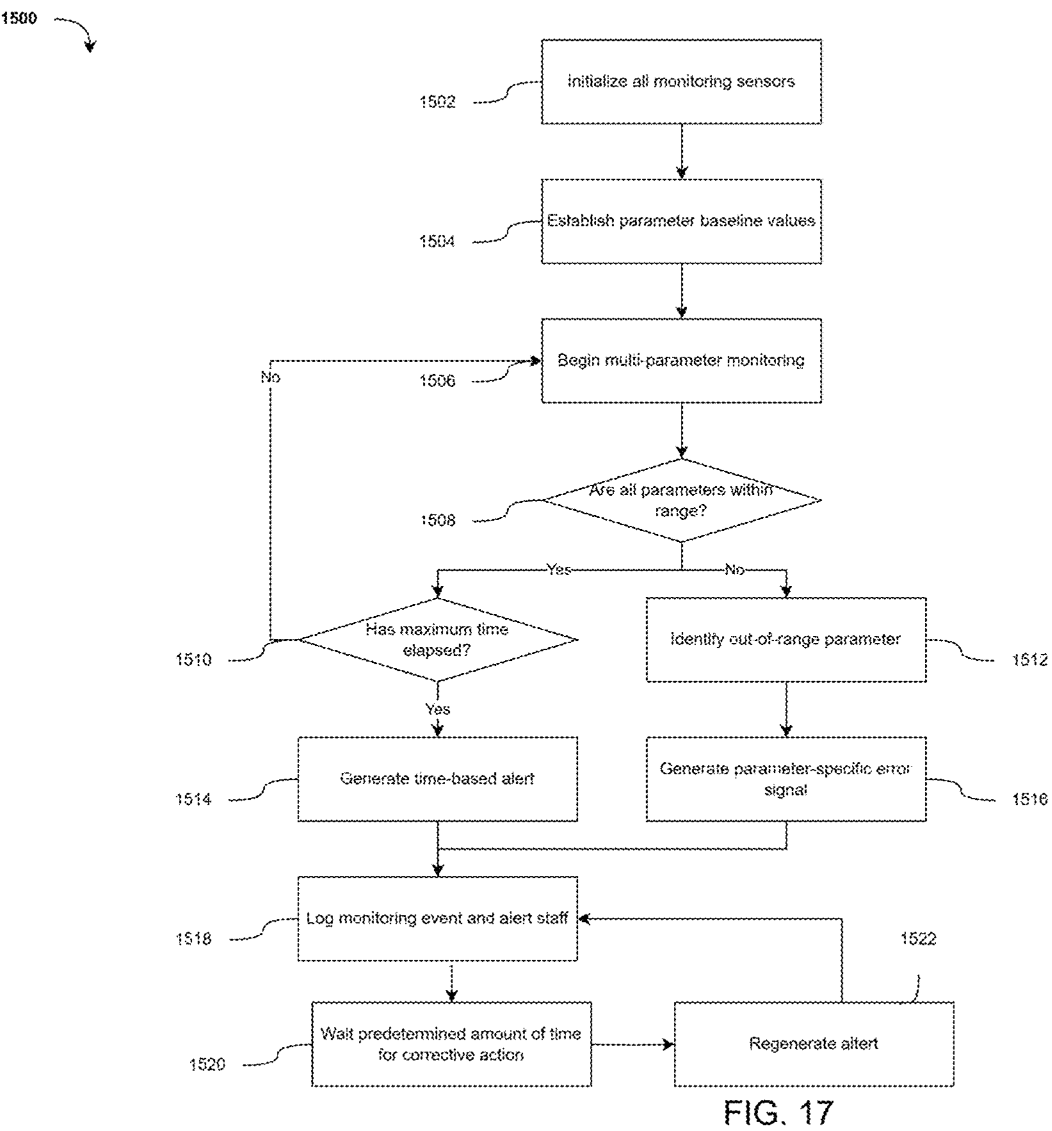
FIG. 17 depicts a flowchart for an illustrative multi-parameter monitoring method.

FIG. 17 illustrates a flowchart for a multi-parameter monitoring method (1500) that may be implemented in any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800). Method (1500) begins at step (1502), where all monitoring sensors are initialized. This initialization may include calibration and self-diagnostic procedures to ensure accurate readings.

Following initialization, method (1500) proceeds to step (1504), where parameter baseline values are established. These baselines may serve as reference points for subsequent monitoring and analysis.

Method (1500) then advances to step (1506), where multi-parameter monitoring begins. This monitoring may involve simultaneous tracking of various order characteristics such as weight, temperature, and humidity. It should be understood that if an order is suitably removed prior to any error signal or alert being generated, method (1500) may cease. Following the initiation of monitoring, method (1500) proceeds to step (1508), which determines whether all parameters are within their acceptable ranges. These ranges may be predetermined based on order type, food safety standards, and quality control requirements. For example, hot food items may have minimum temperature thresholds, while cold items have maximum temperature limits. Similarly, weight parameters may have acceptable tolerances based on expected order composition.

If all parameters are within their acceptable ranges (Yes branch from step (1508)), the process advances to step (1510), which determines whether the maximum allowable time has elapsed for the order. This time-based monitoring is critical for ensuring food quality and safety, as even orders with initially acceptable parameters may deteriorate over time. The maximum allowable time may vary based on order type, with different thresholds for hot foods, cold items, or ambient temperature products. If the maximum time has elapsed (Yes branch from step (1510)), the process proceeds to step (1514), where a time-based alert is generated to notify staff that the order has exceeded its optimal holding period.

If any parameters are found to be outside their acceptable ranges at step (1508) (No branch), the process moves to step (1512), where the specific out-of-range parameters are identified and analyzed. This identification process may involve determining which particular parameters have violated their thresholds, the magnitude of the violations, and potential correlations between multiple parameter deviations. For instance, the system might detect that both temperature and humidity levels have exceeded acceptable ranges, suggesting a potential environmental issue affecting the order.

Following the identification of out-of-range parameters at step (1512), the process advances to step (1516), where parameter-specific error signals are generated. These signals may be tailored to the specific type and severity of the parameter violation. For example, a critical temperature violation might trigger both visual and auditory alerts, while a minor weight discrepancy might generate a less urgent notification. The system may also prioritize alerts based on food safety implications, with temperature violations for perishable items receiving higher priority than other parameter deviations.

From both step (1514) (time-based alerts) and step (1516) (parameter-specific alerts), the process converges at step (1518), where comprehensive monitoring event data is logged and staff are alerted through appropriate channels. This logging process creates a detailed record of the parameter violations, including the specific parameters affected, the magnitude and duration of the deviations, the time of occurrence, and the order details. Staff notifications may be delivered through various channels including the smart pickup unit's display, mobile device alerts, audible signals, or integration with existing kitchen management systems. The alerts may include specific instructions for corrective actions based on the type of violation detected, such as remaking an order that has exceeded temperature thresholds or adding missing items to an order with weight discrepancies. Following the logging and alert generation, the process advances to step (1520), where the system waits a predetermined amount of time for staff to implement corrective actions. After this waiting period, the process moves to step (1522), where the alert is regenerated if no corrective action has been taken. From step (1522), the process returns to step (1518), creating a continuous loop of logging, alerting, waiting, and regenerating alerts until appropriate corrective action is taken or the order is removed from the smart pickup unit.

Figure 18:
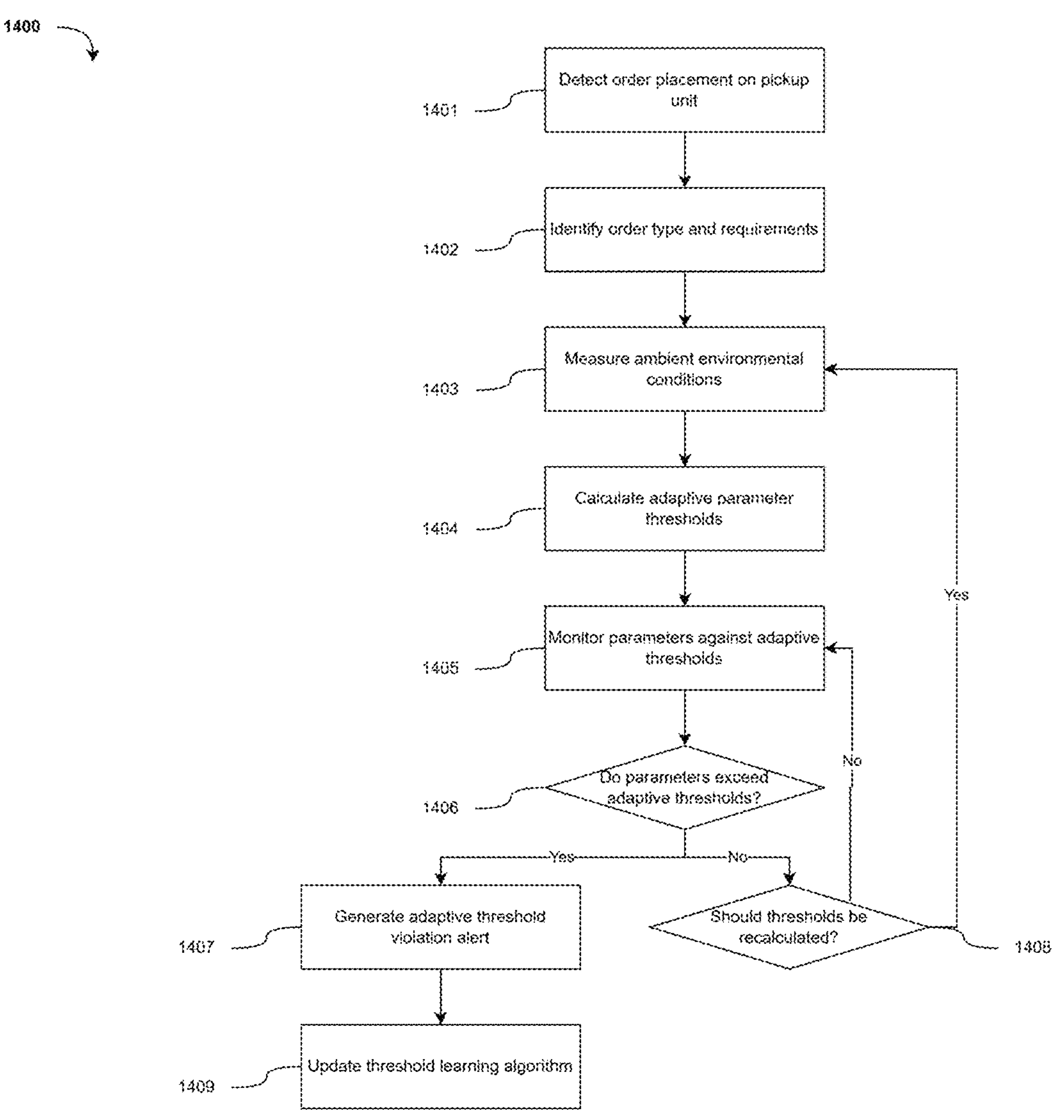
FIG. 18 depicts a flowchart for an illustrative adaptive parameter monitoring method.

FIG. 18 illustrates a flowchart for an adaptive parameter monitoring method (1400) that may be implemented in any of the illustrative systems described or contemplated herein, including smart pickup system (100), multi-unit smart pickup system (200), smart pickup unit (300), smart pickup unit (120), smart pickup multi-unit system (400), smart pickup countertop shelf system (500), smart pickup wall mounted system (600), smart pickup cabinet system (700), and smart pickup integrated system (800). Method (1400) begins at step (1401), where order placement is detected on a pickup unit. This detection may trigger subsequent monitoring and analysis processes.

Following detection, method (1400) proceeds to step (1402), where order type and requirements are identified. This identification may involve referencing order details from a point-of-sale system or smart pickup management software.

Method (1400) then advances to step (1403), where ambient environmental conditions are measured. These measurements may include factors such as room temperature, humidity, or other relevant environmental parameters.

From step (1403), method (1400) moves to step (1404), where adaptive parameter thresholds are calculated based on measured conditions. These adaptive thresholds allow a system to adjust its monitoring criteria based on current environmental factors, potentially improving accuracy of order monitoring.

Following threshold calculation, method (1400) proceeds to step (1405), where parameters are monitored against the adaptive thresholds. This monitoring may involve continuous measurement of various order characteristics such as temperature, weight, or humidity, comparing these measurements against the dynamically established thresholds. The process then advances to step (1406), which determines if parameters exceed the adaptive thresholds. This determination evaluates whether any monitored parameters have violated their respective adaptive limits, potentially indicating an issue with order quality or accuracy.

If parameters exceed thresholds at step (1406) (Yes branch), method (1400) moves to step (1407), where an adaptive threshold violation alert is generated. This alert may notify staff of specific parameter violations while accounting for current environmental conditions. The process then continues to step (1409), where the threshold learning algorithm is updated based on the violation data, enabling the system to refine its adaptive thresholds for future monitoring scenarios.

If parameters do not exceed thresholds at step (1406) (No branch), method (1400) moves to step (1408), which determines if thresholds should be recalculated. This determination may consider factors such as significant changes in ambient conditions, elapsed time since the last calculation, or detection of new environmental variables that could affect order parameters. If thresholds should be recalculated (Yes branch), the process returns to step (1403) to measure ambient conditions again. If thresholds should not be recalculated (No branch), the process returns to step (1405) to continue parameter monitoring. Monitoring may stop once the order is removed in accordance with the description herein.

In some cases, a smart pickup system may track how long orders sit and adjust alerts based on ambient conditions. This tracking may involve monitoring order placement time and comparing it against expected pickup times. Alert thresholds may be dynamically adjusted based on factors such as room temperature or humidity, allowing for more flexible and context-aware monitoring.

A smart pickup system may use a dual algorithm approach, combining pre-specified parameters and machine learning from order history. Pre-specified parameters may include standard weight ranges or temperature thresholds for common order types. Machine learning algorithms may analyze historical order data to identify patterns and refine these parameters over time, potentially improving accuracy of order verification and monitoring processes.

VI. Illustrative Uses of Smart Pickup System

In some cases, a restaurant may implement a smart pickup system to streamline order management and improve customer experience. For example, a fast-casual establishment with limited counter space may utilize a wall-mounted configuration of smart pickup units. This arrangement may allow efficient use of vertical space while providing clear order identification for customers.

A smart pickup system may address challenges in order accuracy verification. In a busy kitchen environment, staff may inadvertently place incorrect items in an order package. A smart pickup unit equipped with weight sensors and machine learning capabilities may detect discrepancies between expected and actual order weights. This detection may trigger an alert, prompting staff to double-check order contents before making them available for pickup.

In some implementations, a smart pickup system may enhance order freshness management. For instance, a coffee shop may use temperature-controlled smart pickup units for hot beverages. These units may monitor drink temperature over time and notify staff when a beverage falls below a predetermined temperature threshold, ensuring customers receive their orders at optimal serving temperatures.

A smart pickup system may also improve security and reduce order theft. In a food court setting with multiple restaurants sharing a pickup area, smart pickup units may incorporate customer check-in features. Orders may remain locked and unnamed until a customer authenticates via mobile app or QR code scan. This approach may minimize the risk of accidental or intentional order removal by unauthorized individuals.

For restaurants offering both dine-in and takeout services, a smart pickup system may assist in prioritizing order preparation. By tracking real-time data on customer arrivals and order readiness, kitchen staff may optimize their workflow to balance the needs of in-house diners and pickup customers. This data-driven approach may lead to reduced wait times and improved overall customer satisfaction. Additionally, the system can utilize customer geolocation data to help restaurants determine precisely when to begin preparing an order. The smart pickup system can leverage customer location information to optimize food freshness and preparation timing. This geolocation capability helps businesses meet customer expectations regarding timing while ensuring orders are prepared at the optimal moment, neither too early (risking food quality deterioration) nor too late (causing customer wait times).

In some cases, a smart pickup system may facilitate contactless pickup options. During periods of heightened health concerns, customers may prefer minimal interaction with staff or other patrons. Smart pickup units with clear displays and intuitive interfaces may allow customers to locate and retrieve their orders independently, reducing physical contact points within the restaurant.

A multi-unit smart pickup system may enable efficient handling of large group orders or catering requests. For example, a corporate lunch order comprising multiple individual meals may be distributed across several smart pickup units. Each unit may display relevant information such as employee names or department designations, simplifying the pickup process for the catering coordinator or individual employees collecting their meals.

In some implementations, a smart pickup system may integrate with third-party delivery services. When a delivery driver arrives to collect an order, they may interact with a designated smart pickup unit. This unit may verify driver identity, provide order details, and record pickup time. Such integration may streamline communication between restaurant staff and delivery personnel, potentially reducing errors and minimizing wait times for drivers.

A smart pickup system may also support dynamic order routing in multi-kitchen environments. For instance, a food hall with multiple vendors may utilize a centralized smart pickup area. As orders are prepared by different kitchens, they may be assigned to specific smart pickup units based on factors such as order type, customer location within the venue, or current unit availability. This intelligent routing may optimize space utilization and improve overall pickup efficiency.

In some cases, a smart pickup system may enhance inventory management and waste reduction efforts. By analyzing data on order patterns, pickup times, and item popularity, restaurant managers may make informed decisions about food preparation schedules and ingredient ordering. This data-driven approach may lead to more accurate forecasting, potentially reducing food waste and improving cost efficiency.

A smart pickup system may also support personalized customer experiences. For example, a loyalty program integrated with smart pickup units may recognize frequent customers and display personalized messages or offer suggestions based on past orders. This level of customization may enhance customer engagement and encourage repeat business.

In some implementations, a smart pickup system may facilitate order handoff in drive-thru scenarios. Smart pickup units positioned near drive-thru windows may assist staff in managing multiple orders simultaneously. These units may provide clear visual cues for order status and customer identification, potentially reducing errors and improving service speed in high-volume drive-thru operations.

A smart pickup system may serve as a coordination hub for autonomous delivery vehicles. When an order is placed on a smart pickup pad, the system can automatically notify autonomous delivery networks or robots that the order is ready for pickup and identify which specific autonomous vehicle or robot the order should be delivered to. This communication helps delivery providers optimize their routes and delivery timing. As the autonomous vehicle arrives at the restaurant's designated pickup area or parking lot, the vehicle can communicate with the smart pickup system, causing the appropriate pad to illuminate or display the vehicle's identifier, such as a registration number or parking slot number. This enables staff or designated runners to quickly identify which order corresponds to which autonomous vehicle, streamlining the handoff process. In some implementations, a dedicated runner may be responsible for transporting orders from the smart pickup pad to the waiting autonomous vehicles. Alternatively, the runner itself could be a robot, eliminating the need for human intervention in the delivery handoff process. In such cases, the smart pickup pad could establish direct wireless communication with the robot runner, eliminating the need for visual indicators and instead providing precise digital instructions about which order to collect. The smart pickup system can also record precise timestamps of when orders are collected by autonomous vehicles, providing data for delivery time optimization and tracking. This interface between restaurants and autonomous delivery systems creates a seamless coordination pathway that accommodates both human runners and fully automated solutions, allowing for flexible implementation based on a restaurant's specific needs and technological capabilities.

In some implementations, smart pickup pads may be utilized for back-of-house inventory management. By placing pads underneath containers of ingredients, restaurants can track inventory levels in real-time without manual counting. The system can monitor weight changes as ingredients are used throughout service periods, automatically generating alerts when supplies reach predetermined thresholds. This application extends beyond simple weight monitoring, as the smart pickup system can also track temperature and humidity conditions of stored ingredients, ensuring food safety compliance. The data collected from these inventory-monitoring pads can integrate with ordering systems to automate replenishment and provide analytics on usage patterns across different dayparts or seasons.

Smart pickup pads may also be implemented as portioning control tools in food preparation areas. In assembly-line settings similar to those found in fast-casual restaurants, each preparation station can be equipped with a smart pickup pad that provides immediate feedback on portion sizes. As staff add ingredients to an order, the pad can display color-coded indicators (green for correct portions, red with directional arrows for over or under-portioning) to ensure consistency across all orders. This application helps restaurants maintain food cost controls while training new staff members on proper portioning techniques. The system can be calibrated to account for different menu items and can adapt to seasonal menu changes through simple software updates.

In drive-thru environments, smart pickup systems may enable enhanced automation and efficiency. Beyond the basic order management capabilities previously described, these systems can be configured to create a fully automated pickup experience. When a customer arrives at the pickup window, their vehicle can be identified through license plate recognition, Bluetooth connectivity, or mobile app geolocation. The smart pickup system can then automatically present the correct order through a specialized dispensing mechanism or carousel system containing multiple smart pickup pads. This configuration allows customers to retrieve their orders with minimal wait time and without requiring direct staff interaction. The window can automatically open when the customer is authenticated, allowing them to take their order directly from the illuminated smart pickup pad, creating a seamless, contactless experience while maintaining order security and accuracy.

Smart pickup systems may facilitate novel social interactions in hospitality settings such as bars and nightclubs. In these environments, each table or seating area can be equipped with a smart pickup pad that serves as both a drink delivery location and a social communication tool. Patrons can use a venue's mobile application to send drinks to other tables along with personalized messages that appear on the recipient's smart pickup pad when their drink arrives. When the bartender places the ordered drink on the designated pad, the system authenticates the delivery and displays the sender's message, creating a modern approach to traditional social interactions. This application creates new revenue opportunities for venues while enhancing the customer experience through technology-enabled social connections. The system can also incorporate age verification features and consumption monitoring to promote responsible service practices.

The smart pickup system may find applications across various industries beyond food service, where order accuracy, security, and efficient pickup processes are valuable. These alternative implementations may leverage the same core sensing, verification, and management capabilities while adapting to industry-specific requirements.

Retail and E-Commerce

In retail environments, smart pickup systems may facilitate order fulfillment for online purchases and in-store pickups. Customers may place orders online and collect them from designated smart pickup areas within retail stores. The system may verify order contents through weight and dimensional analysis, ensuring customers receive complete orders while reducing theft and pickup errors. Large retailers may implement multi-unit configurations to handle high volumes of pickup orders during peak shopping periods.

Pharmacy and Healthcare

Pharmaceutical applications may utilize smart pickup systems for prescription medication dispensing. The system may verify prescription accuracy through weight analysis and package identification, ensuring patients receive correct medications and dosages. Temperature monitoring capabilities may be particularly valuable for medications requiring specific storage conditions. The security features may help prevent unauthorized access to controlled substances while maintaining patient privacy through authentication requirements.

Automotive Parts and Service

Auto parts retailers and service centers may implement smart pickup systems for parts distribution and completed service items. The system may verify parts accuracy through weight and dimensional measurements, ensuring customers receive correct components for their vehicles. Service centers may use the system to manage completed maintenance items such as replaced parts or personal belongings removed from vehicles during service.

Electronics and Technology

Electronics retailers may utilize smart pickup systems for high-value items such as smartphones, laptops, and gaming equipment. The security features may be particularly valuable for preventing theft of expensive electronics. The system may verify order completeness through weight analysis and package dimensions, ensuring customers receive all accessories and components included with their purchases.

Library and Educational Materials

Libraries and educational institutions may implement smart pickup systems for book reservations, equipment loans, and educational materials. The system may track borrowed items and send automated reminders for returns. Academic institutions may use the system for distributing textbooks, laboratory equipment, or student materials while maintaining accurate inventory records.

Laboratory and Scientific Equipment

Research facilities and laboratories may utilize smart pickup systems for managing sensitive equipment, samples, and materials. Temperature and humidity monitoring capabilities may be valuable for maintaining proper storage conditions for biological samples or chemical reagents. The system may track chain of custody for important specimens and ensure proper handling protocols are followed.

Manufacturing and Industrial Supply

Manufacturing facilities may implement smart pickup systems for tool distribution, parts management, and supply chain operations. The system may track tool usage, monitor inventory levels, and ensure proper equipment returns. Weight sensors may verify parts shipments and detect discrepancies in received materials.

Legal and Document Services

Law firms and document processing centers may use smart pickup systems for confidential document distribution. The security features may ensure only authorized personnel access sensitive materials. The system may track document handling and maintain audit trails for compliance purposes.

VII. Illustrative Combinations

The following examples relate to various non-exhaustive ways in which the teachings herein can be combined or applied. It should be understood that the following examples are not intended to restrict the coverage of any claims that can be presented at any time in this application or in subsequent filings of this application. No disclaimer is intended. The following examples are being provided for nothing more than merely illustrative purposes. It is contemplated that the various teachings herein can be arranged and applied in numerous other ways. It is also contemplated that some variations can omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A customer facing smart pickup system, comprising: a smart pickup unit comprising a base platform configured to support an order; a plurality of sensors integrated with the smart pickup unit and configured to collect data about the order; a microcontroller in communication with the plurality of sensors and configured to analyze the collected data; and a user interface operatively connected to the microcontroller and configured to provide feedback based on the analyzed data.

Example 2

The customer facing smart pickup system of Example 1, wherein the plurality of sensors comprises weight sensors configured to measure a weight and weight distribution of the order.

Example 3

The customer facing smart pickup system of any one of Examples 1-2, wherein the plurality of sensors further comprises at least one of: a temperature sensor, a humidity sensor, or a volume sensor.

Example 4

The customer facing smart pickup system of any one of Examples 1-3, wherein the user interface comprises a display configured to show order information and status updates.

Example 5

The customer facing smart pickup system of Example 4, wherein the display is integrated into the base platform of the smart pickup unit.

Example 6

The customer facing smart pickup system of any one of Examples 1-5, further comprising smart pickup management software in communication with the microcontroller and configured to coordinate operation of multiple smart pickup units.

Example 7

The customer facing smart pickup system of Example 6, wherein the smart pickup management software is further configured to interface with external systems including a point-of-sale system and a kitchen display system.

Example 8

A method of verifying order accuracy in a smart pickup system, comprising: receiving an order placement notification; designating a specific smart pickup unit for the order; detecting placement of an order on the designated smart pickup unit; collecting sensor data from the smart pickup unit; analyzing the collected sensor data; and determining whether the sensor data matches expected order parameters.

Example 9

The method of Example 8, further comprising: generating an order accuracy alert if the sensor data does not match the expected order parameters; and notifying staff of a potential order discrepancy.

Example 10

The method of any one of Examples 8-9, wherein the sensor data comprises weight data collected from weight sensors integrated with the smart pickup unit.

Example 11

The method of Example 10, wherein analyzing the collected sensor data comprises: comparing the weight data to an expected weight range for the order; and determining a weight distribution pattern of the order.

Example 12

The method of any one of Examples 10-11, wherein the sensor data further comprises at least one of temperature data or volume data.

Example 13

The method of any one of Examples 8-12, further comprising: displaying an order ready notification if the sensor data matches the expected order parameters; and verifying order pickup by detecting removal of the order from the smart pickup unit.

Example 14

The method of Example 13, further comprising: authenticating a customer prior to allowing order pickup; and logging successful order completion after verifying order pickup.

Example 15

A customer facing multi-unit smart pickup system, comprising: a plurality of smart pickup units, each smart pickup unit comprising a base platform configured to support an order and a plurality of sensors configured to collect data about the order; smart pickup management software in communication with the plurality of smart pickup units; and a display operatively connected to the smart pickup management software and configured to provide order status information.

Example 16

The customer facing multi-unit smart pickup system of Example 15, wherein each smart pickup unit further comprises a microcontroller configured to analyze the data collected by the plurality of sensors.

Example 17

The customer facing multi-unit smart pickup system of any one of Examples 15-16, wherein the plurality of sensors comprises weight sensors configured to measure a weight and weight distribution of the order.

Example 18

The customer facing multi-unit smart pickup system of any one of Examples 15-17, wherein the plurality of sensors further comprises at least one of: a temperature sensor, a humidity sensor, or a volume sensor.

Example 19

The customer facing multi-unit smart pickup system of any one of Examples 15-18, wherein the smart pickup management software is configured to: receive sensor data from the plurality of smart pickup units; analyze the sensor data to determine order accuracy; and generate alerts if the sensor data does not match expected order parameters.

Example 20

The customer facing multi-unit smart pickup system of any one of Examples 15-19, wherein the smart pickup management software is further configured to: authenticate customers prior to allowing order pickup; track order pickup times; and optimize order placement across the plurality of smart pickup units based on historical pickup data and current system utilization.

VII. Miscellaneous

It should be understood that any one or more of the teachings, expressions, embodiments, examples, etc. described herein can be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein can be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein can be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A smart pickup system, comprising:

a smart pickup unit configured to independently support an order and further configured to verify accuracy of the order, the smart pickup unit comprising:

a base platform comprising a one or more base coupling connectors configured to mechanically and electrically couple with one or more adjacent base platforms of respective additional smart pickup units to form a customizable modular array of smart pickup units, wherein at least two smart pickup units of the modular array are configured to collectively support a multi-unit order spanning across the at least two smart pickup units and aggregate sensor data from the at least two smart pickup units to verify accuracy of the multi-unit order;

a pad removably mounted on the base platform, wherein the pad is configured to support the order;

a plurality of sensors, wherein the plurality of sensors collect data about the order placed on the pad;

a microcontroller in communication with the plurality of sensors, wherein the microcontroller determines order accuracy of the supported order by comparing the collected data against one or more predetermined parameters associated with the supported order retrieved from one or more external systems and generates an order accuracy alert in response to the determined order accuracy; and a user interface operatively connected to the microcontroller, wherein the user interface provides a first visual feedback in response to the order accuracy determination and a second visual feedback in response to the order accuracy alert.

2. The smart pickup system of claim 1, wherein the plurality of sensors comprises weight sensors configured to measure a weight and weight distribution of the order.

3. The smart pickup system of claim 2, wherein the plurality of sensors further comprises at least one of: a temperature sensor, a humidity sensor, or a volume sensor.

4. The smart pickup system of claim 1, wherein the user interface comprises a display configured to show order information and status updates.

5. The smart pickup system of claim 4, wherein the display is integrated into the base platform of the smart pickup unit.

6. The smart pickup system of claim 1, further comprising smart pickup management software in communication with the microcontroller and configured to coordinate operation of multiple smart pickup units.

7. The smart pickup system of claim 6, wherein the microcontroller and smart pickup management software are configured to operate concurrently.

8. The smart pickup system of claim 1, further comprising a connector configured to selectively establish bidirectional electrical communication between the pad and the base platform.

9. The smart pickup system of claim 8, wherein the one or more base coupling connectors are configured to enable power and data transmission between adjacent smart pickup units, such that the smart pickup unit operates as part of a modular, scalable pickup system.

10. The smart pickup system of claim 9, wherein the base platform is configured to couple to a power source via a single detachable cord to thereby power the modular, scalable pickup system, wherein the one or more base coupling connectors are configured to enable electrical power and data transmission between adjacent smart pickup units in a daisy-chain configuration, such that each smart pickup unit is electrically linked in series to at least one other smart pickup unit to share power and communication signals.

11. The smart pickup system of claim 1, wherein the one or more base coupling connectors are positioned on a periphery of the base platform for coupling to the additional smart pickup units.

12. The smart pickup system of claim 1, wherein the pad is removably mounted to the base platform magnetically.

13. A smart pickup system, comprising:

a plurality of smart pickup units, wherein each smart pickup unit of the plurality of smart pickup units is configured to independently support an order and further configured to verify accuracy of the order, wherein at least two smart pickup units are configured to function as a unified surface to collectively support a spanning order on the at least two smart units and aggregate sensor data from the at least two smart pickup units to verify accuracy of the spanning order, wherein each smart pickup unit comprises a base platform configured to support the order;

a plurality of sensors integrated with a respective smart pickup unit of the plurality of smart pickup units and configured to collect data about the order;

a microcontroller in communication with the plurality of sensors, wherein the microcontroller is configured to receive order information associated with a particular customer order from one or more external systems and determine order accuracy of the supported order by comparing the collected data against predetermined parameters specific to the particular customer order; and a user interface operatively connected to the microcontroller and configured to provide a first visual feedback when the order accuracy is determined and a second visual feedback in response to the microcontroller generating an order accuracy alert.

14. The smart pickup system of claim 13, wherein the first visual feedback comprises a visual indicator confirming order readiness for pickup, and the second visual feedback comprises an alert notification indicating a potential order discrepancy.

15. The smart pickup system of claim 13, wherein the plurality of sensors comprises weight sensors configured to measure a weight and weight distribution of the order, and wherein the predetermined parameters comprise expected weight ranges.

16. The smart pickup system of claim 13, wherein the user interface is configured to display order status information based on the order accuracy determination.

17. A smart pickup system, comprising:

a plurality of smart pickup units, wherein each smart pickup unit of the plurality of smart pickup units is configured to independently support an order and further configured to verify accuracy of the order, wherein at least two smart pickup units of the plurality of smart pickup units are configured to function as a unified surface to collectively support a multi-unit order and aggregate sensor data from the at least two smart pickup units to verify accuracy of the multi-unit order, wherein each smart pickup unit of the plurality of smart pickup units comprises a base platform configured to support an order;

a plurality of sensors integrated with a respective smart pickup unit of the plurality of smart pickup units and configured to collect data about the order;

a microcontroller in communication with the plurality of sensors and configured to receive order information from one or more external systems and analyze the collected data in real-time to verify order contents by comparing the collected data against expected order parameters, wherein the expected order parameters correspond to an aggregation of individual item parameters for items included in the order; and a user interface operatively connected to the microcontroller and configured to provide immediate visual feedback indicating an order accuracy determination based on the analyzed data, wherein the user interface is configured to provide a first visual feedback when the collected data matches the expected order parameters and a second visual feedback when the collected data does not match the expected order parameters.

18. The smart pickup system of claim 17, wherein the plurality of sensors comprises weight sensors configured to measure a weight and weight distribution of the order.

19. The smart pickup system of claim 18, wherein the plurality of sensors further comprises at least one of: a temperature sensor, a humidity sensor, or a volume sensor.

* * * * *